(12) United States Patent
Griggs et al.

(10) Patent No.: US 10,614,460 B2
(45) Date of Patent: *Apr. 7, 2020

(54) TRANSACTION INITIATION DETERMINATION SYSTEM UTILIZING TRANSACTION DATA ELEMENTS

(71) Applicant: Visa International Service Association, San Francisco, CA (US)

(72) Inventors: Alfred William Griggs, Menlo Park, CA (US); Brian Byrne, Highlands, CO (US); Lori Van Deloo, Los Altos, CA (US); John F. Sheets, San Francisco, CA (US); Fred Liu, Oakland, CA (US); Kevin Weller, San Anselmo, CA (US); Andre Machicao, Atherton, CA (US); Luba Goldberg, Foster City, CA (US); Marc Batchan, San Francisco, CA (US); Kevin Yuann, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/204,562

(22) Filed: Nov. 29, 2018

(65) Prior Publication Data

US 2019/0095914 A1 Mar. 28, 2019

Related U.S. Application Data

(63) Continuation of application No. 14/061,715, filed on Oct. 23, 2013, now Pat. No. 10,176,478.

(Continued)

(51) Int. Cl.
*G06Q 40/00* (2012.01)
*G06Q 20/40* (2012.01)
*G06Q 20/20* (2012.01)

(52) U.S. Cl.
CPC ............ *G06Q 20/40* (2013.01); *G06Q 20/20* (2013.01); *G06Q 40/00* (2013.01)

(58) Field of Classification Search
CPC ............ G07G 1/0045; G07G 17/0022; G07G 2017/0067; G07G 7/084; G07G 40/02; G07G 40/00

(Continued)

(56) References Cited

U.S. PATENT DOCUMENTS 542,016 A 7/1895 Hall
5,613,012 A 3/1997 Hoffman et al.
(Continued)

FOREIGN PATENT DOCUMENTS

EP 2156397 2/2010
KR 20100024030 3/2010
(Continued)

OTHER PUBLICATIONS

Misra et al. "Security of a mobile transaction: A trust model." Electronic Commerce Research 4.4 (2004): 359-372.*

(Continued)

*Primary Examiner* — Kelly S Campen
(74) *Attorney, Agent, or Firm* — Kilpatrick Townsend & Stockton LLP

(57) ABSTRACT

Embodiments of the invention directed to systems and methods that allow for determining a transaction initiation mode used to conduct a transaction and applying a specific set of rules associated with the transaction initiation mode to the transaction. A transaction authorization request message is received at a server computer. The transaction authorization message is for a transaction between a consumer and a merchant and includes a plurality of data elements. The server computer determines a transaction initiation mode, from among at least three different transaction initiation (Continued)

modes, used to conduct the transaction based at least in part on the data elements. The server computer applies a specific set of rules associated with the transaction initiation mode to the transaction.

20 Claims, 14 Drawing Sheets

Related U.S. Application Data

(60) Provisional application No. 61/767,732, filed on Feb. 21, 2013, provisional application No. 61/767,717, filed on Feb. 21, 2013, provisional application No. 61/717,558, filed on Oct. 23, 2012.

(58) Field of Classification Search
USPC ........ 707/999.01; 235/379, 380; 705/39, 42, 705/26.1, 44
See application file for complete search history.

(56) References Cited

U.S. PATENT DOCUMENTS

| | | | |
|---|---|---|---|
| 5,781,438 A | 7/1998 | Lee et al. | |
| 5,883,810 A | 3/1999 | Franklin et al. | |
| 5,953,710 A | 9/1999 | Fleming | |
| 5,956,699 A | 9/1999 | Wong et al. | |
| 6,000,832 A | 12/1999 | Franklin et al. | |
| 6,014,635 A | 1/2000 | Harris et al. | |
| 6,044,360 A | 3/2000 | Picciallo | |
| 6,163,771 A | 12/2000 | Walker et al. | |
| 6,227,447 B1 | 5/2001 | Campisano | |
| 6,236,981 B1 | 5/2001 | Hill | |
| 6,267,292 B1 | 7/2001 | Walker et al. | |
| 6,327,578 B1 | 12/2001 | Linehan | |
| 6,341,724 B2 | 1/2002 | Campisano | |
| 6,385,596 B1 | 5/2002 | Wiser et al. | |
| 6,422,462 B1 | 7/2002 | Cohen | |
| 6,425,523 B1 | 7/2002 | Shem-Ur et al. | |
| 6,592,044 B1 | 7/2003 | Wong et al. | |
| 6,636,833 B1 | 10/2003 | Flitcroft et al. | |
| 6,748,367 B1 | 6/2004 | Lee | |
| 6,783,065 B2 | 8/2004 | Spitz et al. | |
| 6,805,287 B2 | 10/2004 | Bishop et al. | |
| 6,879,965 B2 | 4/2005 | Fung et al. | |
| 6,891,953 B1 | 5/2005 | Demello et al. | |
| 6,901,387 B2 | 5/2005 | Wells et al. | |
| 6,931,382 B2 | 8/2005 | Laage et al. | |
| 6,938,019 B1 | 8/2005 | Uzo | |
| 6,941,285 B2 | 9/2005 | Sarcanin | |
| 6,980,670 B1 | 12/2005 | Hoffman et al. | |
| 6,990,470 B2 | 1/2006 | Hogan et al. | |
| 6,991,157 B2 | 1/2006 | Bishop et al. | |
| 7,051,929 B2 | 5/2006 | Li | |
| 7,069,249 B2 | 6/2006 | Stolfo et al. | |
| 7,103,576 B2 | 9/2006 | Mann, III et al. | |
| 7,113,930 B2 | 9/2006 | Eccles et al. | |
| 7,136,835 B1 | 11/2006 | Flitcroft et al. | |
| 7,177,835 B1 | 2/2007 | Walker et al. | |
| 7,177,848 B2 | 2/2007 | Hogan et al. | |
| 7,194,437 B1 | 3/2007 | Britto et al. | |
| 7,209,561 B1 | 4/2007 | Shankar et al. | |
| 7,237,251 B1 * | 6/2007 | Oz ....................... | H04N 5/4401 348/E5.006 |
| 7,264,154 B2 | 9/2007 | Harris | |
| 7,287,692 B1 | 10/2007 | Patel et al. | |
| 7,292,999 B2 | 11/2007 | Hobson et al. | |
| 7,353,382 B2 | 4/2008 | Labrou et al. | |
| 7,379,919 B2 | 5/2008 | Hogan et al. | |
| RE40,444 E | 7/2008 | Linehan | |
| 7,415,443 B2 | 8/2008 | Hobson et al. | |
| 7,444,676 B1 | 10/2008 | Asghari-Kamrani et al. | |
| 7,469,151 B2 | 12/2008 | Khan et al. | |
| 7,548,889 B2 | 6/2009 | Bhambri et al. | |
| 7,567,934 B2 | 7/2009 | Flitcroft et al. | |
| 7,567,936 B1 | 7/2009 | Peckover et al. | |
| 7,571,139 B1 | 8/2009 | Giordano et al. | |
| 7,571,142 B1 | 8/2009 | Flitcroft et al. | |
| 7,580,898 B2 | 8/2009 | Brown et al. | |
| 7,584,153 B2 | 9/2009 | Brown et al. | |
| 7,593,896 B1 | 9/2009 | Flitcroft et al. | |
| 7,606,560 B2 | 10/2009 | Labrou et al. | |
| 7,627,531 B2 | 12/2009 | Breck et al. | |
| 7,627,895 B2 | 12/2009 | Gifford et al. | |
| 7,650,314 B1 | 1/2010 | Saunders | |
| 7,685,037 B2 | 3/2010 | Reiners et al. | |
| 7,702,578 B2 | 4/2010 | Fung et al. | |
| 7,707,120 B2 | 4/2010 | Dominguez et al. | |
| 7,712,655 B2 | 5/2010 | Wong | |
| 7,734,527 B2 | 6/2010 | Uzo | |
| 7,753,265 B2 | 7/2010 | Harris | |
| 7,770,789 B2 | 8/2010 | Oder, II et al. | |
| 7,784,685 B1 | 8/2010 | Hopkins, III | |
| 7,793,851 B2 | 9/2010 | Mullen | |
| 7,801,826 B2 | 9/2010 | Labrou et al. | |
| 7,805,376 B2 | 9/2010 | Smith | |
| 7,805,378 B2 | 9/2010 | Berardi et al. | |
| 7,818,264 B2 | 10/2010 | Hammad | |
| 7,828,220 B2 | 11/2010 | Mullen | |
| 7,835,960 B2 | 11/2010 | Breck et al. | |
| 7,841,523 B2 | 11/2010 | Oder, II et al. | |
| 7,841,539 B2 | 11/2010 | Hewton | |
| 7,844,550 B2 | 11/2010 | Walker et al. | |
| 7,848,980 B2 | 12/2010 | Carlson | |
| 7,849,020 B2 | 12/2010 | Johnson | |
| 7,853,529 B1 | 12/2010 | Walker et al. | |
| 7,853,995 B2 | 12/2010 | Chow et al. | |
| 7,865,414 B2 | 1/2011 | Fung et al. | |
| 7,873,579 B2 | 1/2011 | Hobson et al. | |
| 7,873,580 B2 | 1/2011 | Hobson et al. | |
| 7,890,393 B2 | 2/2011 | Talbert et al. | |
| 7,891,563 B2 | 2/2011 | Oder, II et al. | |
| 7,896,238 B2 | 3/2011 | Fein et al. | |
| 7,908,216 B1 | 3/2011 | Davis et al. | |
| 7,922,082 B2 | 4/2011 | Muscato | |
| 7,931,195 B2 | 4/2011 | Mullen | |
| 7,937,324 B2 | 5/2011 | Patterson | |
| 7,938,318 B2 | 5/2011 | Fein et al. | |
| 7,954,705 B2 | 6/2011 | Mullen | |
| 7,959,076 B1 | 6/2011 | Hopkins, III | |
| 7,996,288 B1 | 8/2011 | Stolfo | |
| 8,025,223 B2 | 9/2011 | Saunders et al. | |
| 8,046,256 B2 | 10/2011 | Chien et al. | |
| 8,060,448 B2 | 11/2011 | Jones | |
| 8,060,449 B1 | 11/2011 | Zhu | |
| 8,074,877 B2 | 12/2011 | Mullen et al. | |
| 8,074,879 B2 | 12/2011 | Harris | |
| 8,082,210 B2 | 12/2011 | Hansen et al. | |
| 8,095,113 B2 | 1/2012 | Kean et al. | |
| 8,104,679 B2 | 1/2012 | Brown | |
| RE43,157 E | 2/2012 | Bishop et al. | |
| 8,109,436 B1 | 2/2012 | Hopkins, III | |
| 8,121,942 B2 | 2/2012 | Carlson et al. | |
| 8,121,956 B2 | 2/2012 | Carlson et al. | |
| 8,126,449 B2 | 2/2012 | Beenau et al. | |
| 8,171,525 B1 | 5/2012 | Pelly et al. | |
| 8,175,973 B2 | 5/2012 | Davis et al. | |
| 8,190,523 B2 | 5/2012 | Patterson | |
| 8,196,813 B2 | 6/2012 | Vadhri | |
| 8,205,791 B2 | 6/2012 | Randazza et al. | |
| 8,219,489 B2 | 7/2012 | Patterson | |
| 8,223,949 B2 * | 7/2012 | Mahalank ............ | H04M 7/063 370/352 |
| 8,224,702 B2 | 7/2012 | Mengerink et al. | |
| 8,225,385 B2 | 7/2012 | Chow et al. | |
| 8,229,852 B2 | 7/2012 | Carlson | |
| 8,265,993 B2 | 9/2012 | Chien et al. | |
| 8,280,777 B2 | 10/2012 | Mengerink et al. | |
| 8,281,991 B2 | 10/2012 | Wentker et al. | |
| 8,297,501 B1 | 10/2012 | Kowalchyk et al. | |
| 8,328,095 B2 | 12/2012 | Oder, II et al. | |
| 8,336,088 B2 | 12/2012 | Raj et al. | |
| 8,346,666 B2 | 1/2013 | Lindelsee et al. | |

(56) References Cited

U.S. PATENT DOCUMENTS

| | | |
|---|---|---|
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,433,116 B2 | 4/2013 | Butler et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,657,192 B2 * | 2/2014 | Hodges .................. G06K 7/084 235/380 |
| 8,689,328 B2 * | 4/2014 | Ormazabal ........... H04L 63/123 726/22 |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,367,843 B2 * | 6/2016 | Jurss .................. G06Q 20/40 |
| 9,530,137 B2 | 12/2016 | Weiss |
| 10,176,478 B2 | 1/2019 | Griggs et al. |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2003/0212642 A1 | 11/2003 | Weller et al. |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0162781 A1 * | 8/2004 | Searl .................. G06F 11/0709 705/51 |
| 2004/0210449 A1 | 10/2004 | Breck et al. |
| 2004/0210498 A1 | 10/2004 | Freund |
| 2004/0230530 A1 * | 11/2004 | Searl .................. G06F 11/0709 705/51 |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0086473 A1 * | 4/2008 | Searl .................. G06F 21/552 |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0294563 A1 * | 11/2008 | Boutahar ............... G06Q 20/00 705/76 |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0054092 A1 * | 2/2009 | Stonefield .......... G06Q 30/0601 455/466 |
| 2009/0106112 A1 | 4/2009 | Dalmia et al. |
| 2009/0106160 A1 | 4/2009 | Skowronek |

(56) References Cited

U.S. PATENT DOCUMENTS

| | | |
|---|---|---|
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0218402 A1* | 9/2009 | Hodges .................. G06K 7/084 235/449 |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0010930 A1 | 1/2010 | Allen et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211422 A1* | 8/2010 | Zanzot .................. G06Q 20/02 705/40 |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0066551 A1* | 3/2011 | Bruesewitz ............ G06Q 20/04 705/44 |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0238575 A1 | 9/2011 | Nightengale et al. |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0006893 A1* | 1/2012 | Hodges .................. G06K 7/084 235/449 |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0030094 A1* | 2/2012 | Khalil .................... G06Q 10/06 705/39 |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0095918 A1* | 4/2012 | Jurss ..................... G06Q 20/40 705/44 |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271724 A1* | 10/2012 | Hodges .................. G06K 7/084 705/17 |
| 2012/0271770 A1 | 10/2012 | Harris et al. |
| 2012/0284187 A1 | 11/2012 | Hammad et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder ("J.D."), II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |

(56) References Cited

U.S. PATENT DOCUMENTS

| | | |
|---|---|---|
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212298 A1* | 8/2013 | Bunch .............. H04L 45/42 709/244 |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0238507 A1* | 9/2013 | Hodges .............. G06K 7/084 705/73 |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254052 A1 | 9/2013 | Royyuru et al. |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1* | 4/2014 | Griggs .............. G06Q 20/20 705/44 |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0224976 A1 | 8/2016 | Basu et al. |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor et al. |

FOREIGN PATENT DOCUMENTS

| | | |
|---|---|---|
| KR | 20110095845 | 8/2011 |
| WO | 0135304 | 5/2001 |
| WO | 0135304 | 5/2002 |
| WO | 2004042536 | 5/2004 |
| WO | 2006113834 | 10/2006 |
| WO | 2009032523 | 3/2009 |
| WO | 2010078522 | 7/2010 |
| WO | 2012068078 | 5/2012 |
| WO | 2012098556 | 7/2012 |
| WO | 2012142370 | 10/2012 |
| WO | 2012167941 | 12/2012 |
| WO | 2013048538 | 4/2013 |
| WO | 2013056104 | 4/2013 |

(56) References Cited

FOREIGN PATENT DOCUMENTS

| WO | 2013119914 | 8/2013 |
|---|---|---|
| WO | 2013179271 | 12/2013 |

OTHER PUBLICATIONS

Pearson et al. "Privacy, security and trust issues arising from cloud computing." 2010 IEEE Second International Conference on Cloud Computing Technology and Science. IEEE, 2010.*

U.S. Appl. No. 14/061,715, "Advisory Action", dated Aug. 3, 2018, 3 pages.

U.S. Appl. No. 14/061,715, "Final Office Action", dated Mar. 22, 2017, 15 pages.

U.S. Appl. No. 14/061,715, "Final Office Action", dated Apr. 19, 2018, 6 pages.

U.S. Appl. No. 14/061,715, "Non-Final Office Action", dated Nov. 2, 2016, 15 pages.

U.S. Appl. No. 14/061,715, "Non-Final Office Action", dated Sep. 6, 2017, 20 pages.

U.S. Appl. No. 14/061,715, "Notice of Allowance", dated Sep. 12, 2018, 6 pages.

U.S. Appl. No. 14/061,715, "Restriction Requirement", dated Jun. 23, 2016, 6 pages.

U.S. Appl. No. 14/600,523, Secure Payment Processing Using Authorization Request, dated Jan. 20, 2015, 42 pages.

U.S. Appl. No. 15/008,388, Methods for Secure Credential Provisioning, dated Jan. 27, 2016, 89 pages.

U.S. Appl. No. 15/011,366, Token Check Offline, dated Jan. 29, 2016, 60 pages.

U.S. Appl. No. 15/019,157, Token Processing Utilizing Multiple Authorizations, dated Feb. 9, 2016, 63 pages.

U.S. Appl. No. 15/041,495, Peer Forward Authorization of Digital Requests, dated Feb. 11, 2016, 63 pages.

U.S. Appl. No. 15/265,282, Self-Cleaning Token Vault, dated Sep. 14, 2016, 52 pages.

U.S. Appl. No. 15/462,658, Replacing Token on a Multi-Token User Device, dated Mar. 17, 2017, 58 pages.

U.S. Appl. No. 61/738,832, Management of Sensitive Data, dated Dec. 18, 2012, 22 pages.

U.S. Appl. No. 61/751,763, Payments Bridge, dated Jan. 11, 2013, 64 pages.

U.S. Appl. No. 61/879,362, Systems and Methods for Managing Mobile Cardholder Verification Methods, dated Sep. 18, 2013.

U.S. Appl. No. 61/892,407, Issuer Over-the-Air Update Method and System, dated Oct. 17, 2013, 28 pages.

U.S. Appl. No. 61/894,749, Methods and Systems for Authentication and Issuance of Tokens in a Secure Environment, dated Oct. 23, 2013, 67 pages.

U.S. Appl. No. 61/926,236, Methods and Systems for Provisioning Mobile Devices With Payment Credentials and Payment Token Identifiers, dated Jan. 10, 2014, 51 pages.

U.S. Appl. No. 62/000,288, Payment System Canonical Address Format, dated May 19, 2014, 58 pages.

U.S. Appl. No. 62/003,717, Mobile Merchant Application, dated May 28, 2014, 58 pages.

U.S. Appl. No. 62/024,426, Secure Transactions Using Mobile Devices, dated Jul. 14, 2014, 102 pages.

U.S. Appl. No. 62/037,033, Sharing Payment Token, dated Aug. 13, 2014, 36 pages.

U.S. Appl. No. 62/038,174, Customized Payment Gateway, dated Aug. 15, 2014, 42 pages.

U.S. Appl. No. 62/042,050, Payment Device Authentication and Authorization System, dated Aug. 26, 2014, 120 pages.

U.S. Appl. No. 62/053,736, Completing Transactions Without a User Payment Device, dated Sep. 22, 2014, 31 pages.

U.S. Appl. No. 62/054,346, Mirrored Token Vault, dated Sep. 23, 2014, 38 pages.

U.S. Appl. No. 62/103,522, Methods and Systems for Wallet Provider Provisioning, dated Jan. 14, 2015, 39 pages.

U.S. Appl. No. 62/108,403, Wearables With NFC HCE, dated Jan. 27, 2015, 32 pages.

U.S. Appl. No. 62/117,291, Token and Cryptogram Using Transaction Specific Information, dated Feb. 17, 2015, 25 pages.

U.S. Appl. No. 62/128,709, Tokenizing Transaction Amounts, dated Mar. 5, 2015, 30 pages.

U.S. Pat. No. 8,533,860, "Petition for Inter Partes Review of U.S. Pat. No.", Challenging Claims 1-30 Under 35 U.S.C. § 312 and 37 C.F.R. § 42.104, Before the USPTO Patent Trial and Appeal Board, IPR 2016-00600, Feb. 17, 2016, 65 pages.

PCT/US2013/066467, "International Search Report and Written Opinion", dated Feb. 17, 2014, 10 pages.

PCT/US2013/066467, "International Preliminary Report on Patentability", dated May 7, 2015, 9 pages.

* cited by examiner

| Data Elements (Channel) | Manual PAN Key Entry (320) | Mag-stripe Read (322) | Chip Read (326) | Card Acct on File (328) | Secure Mobile NFC (324) | Certified Token/ Proxy Acct (327) | Uncertified Token/ Proxy Acct (329) |
|---|---|---|---|---|---|---|---|
| CVM (POS) (e.g., Signature / PIN) | ✓ | ✓ | ✓ | | ✓ | | |
| CVV (POS) | | ✓ | | | | | |
| iCVV (POS) | | | ✓ | | | | |
| DCVV (POS) | | | | | ✓ | | |
| Chip cryptogram (POS) | | | ✓ | | | | |
| CVV2 (eCommerce) | ✓ | | | ✓ | | ✓ | ✓ |
| CAVV (eCommerce) | ✓ | | | ✓ | | ✓ | ✓ |
| AVS (All Channels) | ✓ | ✓ | ✓ | ✓ | ✓ | ✓ | ✓ |
| AA Score Data (All) | ✓ | ✓ | ✓ | ✓ | ✓ | ✓ | ✓ |
| Merchant Verification Value (All) | ✓ | ✓ | | ✓ | ✓ | ✓ | ✓ |
| Third Party Agent (TPA) Registration ID (All) | ✓ | ✓ | | ✓ | ✓ | ✓ | ✓ |
| Merchant Geo-location (POS) | | ✓ | | ✓ | ✓ | ✓ | ✓ |
| Registered User Status (All) | | | | ✓ | | ✓ | ✓ |
| Level II/III data, SKU, CPU (All) | ✓ | | | ✓ | | ✓ | ✓ |

Payment Transaction Initiation Mode (450)

FIG. 4B

TRANSACTION INITIATION DETERMINATION SYSTEM UTILIZING TRANSACTION DATA ELEMENTS

CROSS-REFERENCE TO RELATED APPLICATIONS

The present application is a continuation of U.S. patent application Ser. No. 14/061,715 filed on Oct. 23, 2013, which is a non-provisional application of and claims priority to U.S. Provisional Application No. 61/717,558, filed on Oct. 23, 2012, U.S. Provisional Application No. 61/767,717, filed on Feb. 21, 2013, and U.S. Provisional Application No. 61/767,732 filed on Feb. 21, 2013, the entire contents of which are herein incorporated by reference for all purposes.

BACKGROUND

Embodiments of the invention are directed to systems and methods that allow for determining a transaction initiation mode used to conduct a transaction and applying a specific set of rules associated with the transaction initiation mode to the transaction. In recent years, different types of payment modes have developed. For example, payment transactions may be conducted at a physical store, online, or via mail order or telephone order. Additionally, a user may conduct the transaction using a physical card, mobile device, a token, a mobile wallet, etc. Consequently, each type of transaction can have a number of different attributes. It may be useful to identify the transaction initiation mode to identify these attributes. The widely differing transaction initiation attributes may have different risk, security and convenience characteristics that may be used during payment transaction processing.

Embodiments of the invention address this and other problems, both individually and collectively.

SUMMARY

Embodiments of the invention broadly described, allow for determining a transaction initiation mode used to conduct a transaction and applying a specific set of rules associated with the transaction initiation mode to the transaction. More specifically, the invention pertains to generating a credential value and transmitting the credential value to a merchant. The credential value may be created based on a plurality of data elements received in a transaction authorization message and including at least access device information and payment device characteristic information.

Embodiments of the present invention relate to receiving data elements in an authorization transaction message. The authorization transaction message may be generated by a merchant. The type of data elements received may depend on a transaction initiation mode. The data elements may be analyzed and compared against an authentication database, and a credential value may generated based on the data elements. The credential value may be sent to the merchant. The merchant may include the credential value in an authorization request message to an issuer, and the issuer may approve or deny the transaction based on the credential value.

One embodiment of the invention is directed to a method for authenticating a user for a transaction including receiving, at a server computer, a transaction authorization request message for a transaction between a consumer and a merchant, wherein the transaction authorization request message comprises a plurality of data elements. The method also includes determining, by the server computer, a transaction initiation mode, from at least three different transaction initiation modes, used to conduct the transaction based at least in part on the data elements.

Another embodiment of the invention is directed to a device comprising a processor, and a computer readable medium coupled to the processor. The computer readable medium comprises code, executable by the processor, for implementing the above-described method.

Another embodiment of the invention is directed to a method including, receiving, at a server computer, a plurality of data elements. The method also includes validating the plurality of data elements. The method further includes generating a credential value based on the plurality of data elements. The method additionally includes transmitting the credential value to an entity.

It can be appreciated that while the discussion herein describes examples using a payment card and a cardholder, the payment card may be generically referred to as any payment instrument and the cardholder may be generically referred to as a user in other embodiments (where a card is not present). The cardholder may also be referred to as a consumer in other embodiments.

These and other embodiments of the invention are described in further detail below.

BRIEF DESCRIPTION OF THE DRAWINGS

FIG. 4B shows a table illustrating a plurality of data elements that correspond to particular transaction initiation modes, according to an embodiment of the present invention.

DETAILED DESCRIPTION

Figure 1:
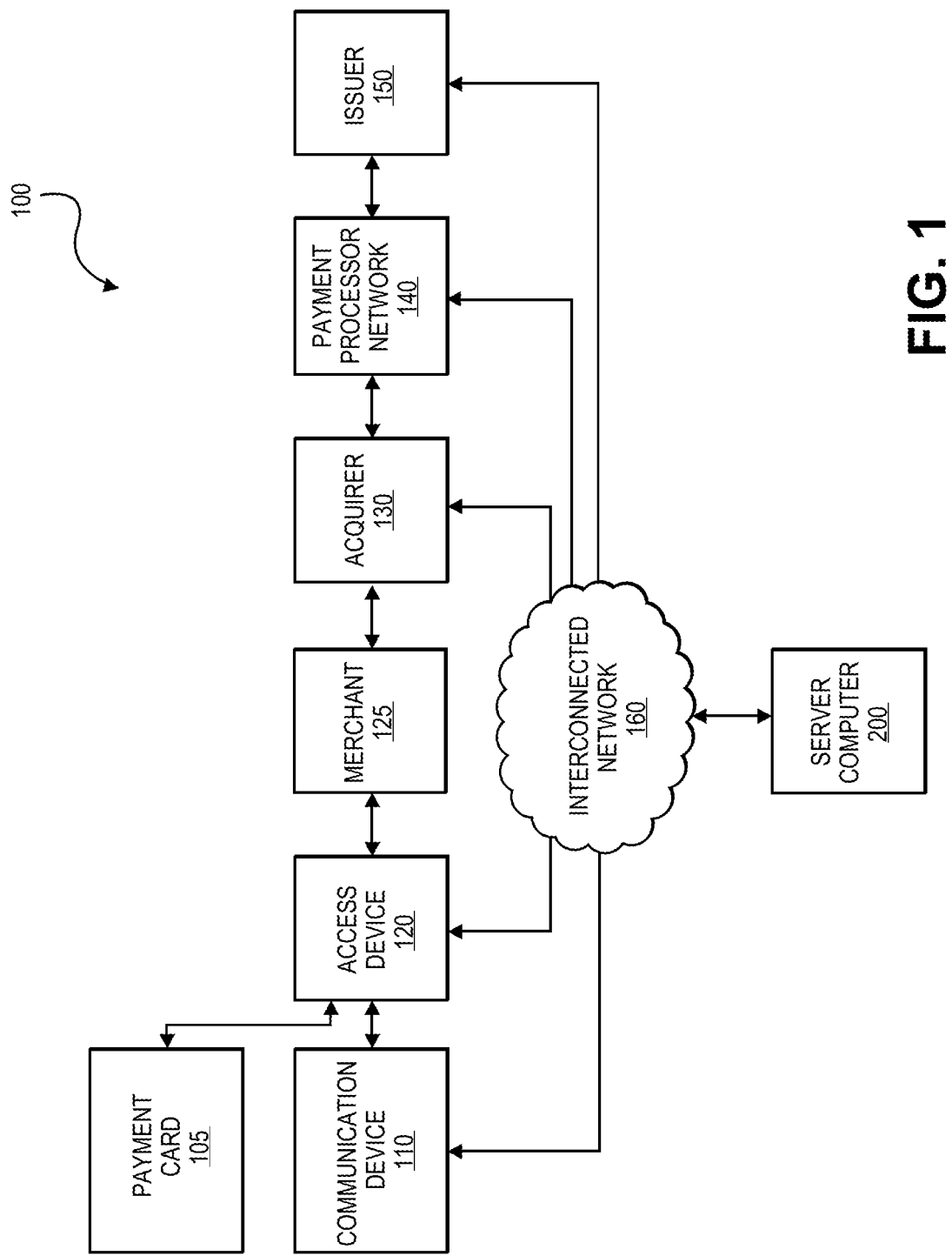
FIG. 1 is a block diagram of a payment system, according to an embodiment of the present invention.

Prior to discussing the specific embodiments of the invention, a further description of some terms can be provided for a better understanding of embodiments of the invention.

A "payment device" may include any suitable device capable of making a payment. For example, a payment device can include a card including a credit card, debit card, charge card, gift card, or any combination thereof. A payment device can be used in conjunction with a communication device, as further defined below.

A "payment processing network" (e.g., VisaNet™) may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests and a Base II system which performs clearing and settlement services.

A "server computer" can be a powerful computer or a cluster of computers. For example, the server computer can be a large mainframe, a minicomputer cluster, or a group of servers functioning as a unit. In one example, the server computer may be a database server coupled to a Web server.

A "terminal" (e.g. a point-of-service (POS) terminal) can be any suitable device configured to accept and process payment transactions such as credit card or debit card transactions, or electronic settlement transactions, and may have optical, electrical, or magnetic readers for reading data from other portable communication devices such as smart cards, keychain device, cell phones, payment cards, security cards, access cards, and the like.

An "acquirer" is a business entity (e.g., a commercial bank) that typically has a business relationship with the merchant and receives some or all of the transactions from that merchant.

An "issuer" is a business entity which issues a card to a user. Typically, an issuer is a financial institution.

A "cardholder" is a type of user that is authorized to use a payment card issued by the issuer. The terms "cardholder" and "user" may be used interchangeably in the following description. A "user" and/or "cardholder" may be any competent individual.

A "communication device," as described herein, can be any electronic communication device that can execute and/or support electronic communications including, but not limited to, payment transactions. Some examples include a personal digital assistant (PDA), a smart phone, tablet computer, notebook computer, and the like.

An "authorization request message" may be an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" (i.e., payment device information) including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. However, it can be appreciated that the authorization request messages described herein may contain additional elements not defined in the ISO 8583 specification.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "communications channel" may include any suitable path for electronic communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of a secure socket layer (SSL) session. However, any method of creating a secure channel may be used. By establishing a secure channel, sensitive information related to a payment device (such as account numbers, CVV values, expiration dates, etc.) may be securely transmitted between the two or more entities to facilitate a transaction.

A "digital wallet provider" may include any suitable entity that can maintain a digital wallet. A digital wallet provider may provide standalone cardholder facing software applications that store account numbers, or representations of the account numbers (e.g., tokens), on behalf of a cardholder to facilitate payments at more than one unrelated merchant, perform person-to-person payments, or load financial value into the digital wallet.

A "merchant of record" may include a merchant that has a relationship with the payment processing network. The merchant of record receives the proceeds from the cardholder when a purchase is settled. The merchant of record is the company that is ultimately responsible for the financial transaction.

A "payment service provider" may include an entity that contracts with an acquirer for the purpose of providing acceptance to a sponsored merchant, the sponsored merchant then contracts with a payment service provider to obtain payment services.

A "card on file transaction" may include a transaction that is conducted using a stored account identifier. A card on file transaction can include transactions initiated by merchants, payment service providers, and/or a digital wallet service provider with, for example, a payment card account number that has been previously collected from the cardholder.

A "token" may include a substitute for a primary account identifier such as a primary account number. Tokens are used in lieu of the primary account number and can be used to generate original and subsequent transactions for an entire transaction lifecycle. A token may be in a format that is similar to a primary account number. For example, if a real primary account number has 16 digits, then a corresponding payment token may also have 16 digits.

An "access device" may include any device capable of initiating a payment transaction or accepting a payment device. The access device allows for acceptance of a payment card via inserting, swiping, manual key entry, digital wallet, secure token, etc. The access device can communicate with the acquirer, sometimes via the merchant, using a wired or wireless communication.

"Access device information" may include data relating to an access device used to conduct a payment transaction. Access device information can include, but is not limited to, information indicating whether a mobile device, a contactless reader, or a magnetic stripe reader was used to conduct the payment transaction. Access device information may also include information about the specific access device including an access device manufacturer's identifier, an access device make, an access device model, digital certificates associated with the specific access device, etc.

"Payment device characteristic information" may include data regarding a payment device that is used to conduct a payment transaction. Payment device characteristic information can include, but is not limited to, information indicating whether a physical card, a mobile device, or a token was used to conduct the payment transaction.

A "transaction initiation channel" may include a channel that is used to conduct a payment transaction. The transaction initiation channel indicates whether a payment transaction was conducted at a physical store, online, via mail order, via telephone order, etc.

A "transaction initiation mode" may define the type of transaction between a consumer and a merchant. The transaction initiation mode can be determined based on the access device information and the payment device characteristic information. Some transaction initiation modes include, but are not limited to, magnetic stripe read, chip card, secure mobile near field communication (NFC), manual primary account number (PAN) entry, card account on file, certified token, and uncertified token.

I. Exemplary Systems

FIG. 1 is a block diagram of a payment system 100, according to one embodiment of the present invention. The system 100 includes a communication device 110 and a payment card 105, which may be used by a consumer (not shown). The communication device 110 and the payment card 105 may interact with an access device 120 to conduct a payment. The access device 120 may be operated by a merchant 125. The merchant 125 and the access device 120 may be in communication with an issuer 150 via an acquirer 130 and a payment processing network 140. In some embodiments, the acquirer 130 includes an acquirer computer (not shown) and the issuer 150 includes an issuer computer (not shown). The payment processing network 140 may include an authorization and settlement server and/or additional servers (not shown) to carry out the various transactions described herein.

The communication device 110 may be in communication with the various entities shown in FIG. 1 via the interconnected network 160. The interconnected network 160 may also be in communication with a server computer 200.

In an embodiment, the communication device 110 is in electronic communication with the access device 120. The communication device 110 can be a personal digital assistant (PDA), a smart phone, tablet computer, notebook computer, or the like, that can execute and/or support payment transactions with a payment system 100. A communication device 110 can be used in conjunction with a payment device, such as a credit card, debit card, charge card, gift card, or other payment device and/or any combination thereof. The combination of a payment device (e.g., credit card) and the communication device 110 (e.g., smart phone) can be referred to as the communication device 110 for illustrative purposes. In other embodiments, the communication device 110 may be used in conjunction with transactions of currency or points (e.g., points accumulated in a particular software application). In further embodiments, the communication device 110 may be a wireless device, a contactless device, a magnetic device, or other type of payment device that would be known and appreciated by one of ordinary skill in the art with the benefit of this disclosure. In some embodiments, the communication device 110 includes software (e.g., application) and/or hardware to perform the various payment transactions and capture user voice data as further described below.

The access device 120 may be a point of sale terminal at a merchant's physical location (e.g., at a merchant's store) or it may be a gateway to a website operated by the merchant 125.

In some embodiments, the access device 120 is configured to be in electronic communication with the acquirer 130 via a merchant 125. In one embodiment, the terminal 120 is a point-of-sale (POS) device. Alternatively, the terminal 120 can be any suitable device configured to process payment transactions such as credit card or debit card transactions and may have optical, electrical, or magnetic readers for reading data from portable electronic communication devices such as smart cards, keychain device, cell phones, payment cards, security cards, access cards, and the like. In some embodiments, the terminal 120 is located at and controlled by a merchant. For example, the terminal 120 can be a POS device at a grocery store checkout line. In other embodiments, the terminal could be a client computer or a mobile phone in the event that the user is conducting a remote transaction.

In other embodiments, the access device 120 may be a gateway for a Web site operated by the merchant 125. The merchant's Web site may include an electronic storefront, a shopping cart, and other functions associated with e-commerce Web sites.

The acquirer 130 (e.g., acquirer bank) includes an acquirer computer (not shown). The acquirer computer can be configured to transfer data (e.g., bank identification number (BIN), etc.) and financial information to the payment processing network 140. In some embodiments, the acquirer 130 does not need to be present in the system 100 for the communication device 110 to transfer the financial and user data to the payment processing network 140.

In one embodiment, the payment processing network 140 can be any suitable combination of computers that can facilitate payment transactions involving a number of issuers and merchants. One example of a payment processing network is VisaNet™, where Visa internal processing (VIP) performs the various payment processing network 140 or multi-lateral switch functions described herein. The payment processing network 140 can include an authorization and settlement server (not shown). The authorization and settlement server ("authorization server") performs payment authorization functions. The authorization server is further configured to send and receive authorization data to the issuer 150.

In some embodiments, the issuer 150 is a business entity which issues an account for a user. The account can be associated with a payment card used by the user. Typically, an issuer is a financial institution. The issuer 150 is configured to receive the authorization data from the payment processing network 140 (e.g., the authorization server).

In some embodiments, the communication device 110 may be connected to and communicate with the payment processor network 140 via an interconnected network 160. One example of an interconnected network 160 is the Internet. The payment processor network 140 may inform the communication device 110 when a payment has been successfully processed. In some embodiments, the payment processor network 140 may be connected to and communicate with the access device 120 via the interconnected network 160. The payment processor network 140 may inform the access device 120 when a payment has been successfully processed which in turn the access device 120 may complete the transaction with the communication device 110.

A server computer 200 is also shown in FIG. 1, and is in operative communication with the interconnected network 160. The server computer 200 can be configured to perform a number of functions including determining a particular transaction initiation mode based on a number of different data elements, apply specific rules based on a determined transaction initiation mode, and generate credential values that can be used in electronic payment transactions. Although the server computer 200 is shown as being separate from entities such as the payment processing network 140, the server computer 200 may be incorporated into entities such as the payment processing network 140 in other embodiments of the invention. Further details regarding the server computer 200 are provided below.

The interconnected network 160 may comprise one or more of a local area network, a wide area network, a metropolitan area network (MAN), an intranet, the Internet, a Public Land Mobile Network (PLMN), a telephone network, such as the Public Switched Telephone Network (PSTN) or a cellular telephone network (e.g., wireless Global System for Mobile Communications (GSM), wireless Code Division Multiple Access (CDMA), etc.), a VoIP network with mobile and/or fixed locations, a wireline network, or a combination of networks.

In a typical payment transaction in embodiments of the invention, a user may interact with the access device 120 (e.g., with a payment device such as a payment card, or by entering payment information) to conduct a transaction with the merchant 125. The merchant 125 may operate a merchant computer, which may route an authorization request message to the acquirer 130, and eventually to the issuer 150 via the payment processing network 140.

The issuer 140 will then determine if the transaction is authorized (e.g., by checking for fraud and/or sufficient funds or credit). The issuer will then transmit an authorization response message to the terminal 120 via the payment processing network 140 and the acquirer 130.

At the end of the day, or at another predefined time, the transaction is cleared and settled between the acquirer 130 and the issuer 150 by the payment processing network 140.

The description below provides descriptions of other components in the system as well as methods for determining a transaction initiation mode. The methods can be performed at any suitable point during the above-described transaction flow. For example, the method may be performed before or after the user uses a payment device to interact with the terminal 120. If it is afterwards, then the method may be performed when the authorization request message is received by the payment processing network 140 or the issuer 150.

Figure 2:
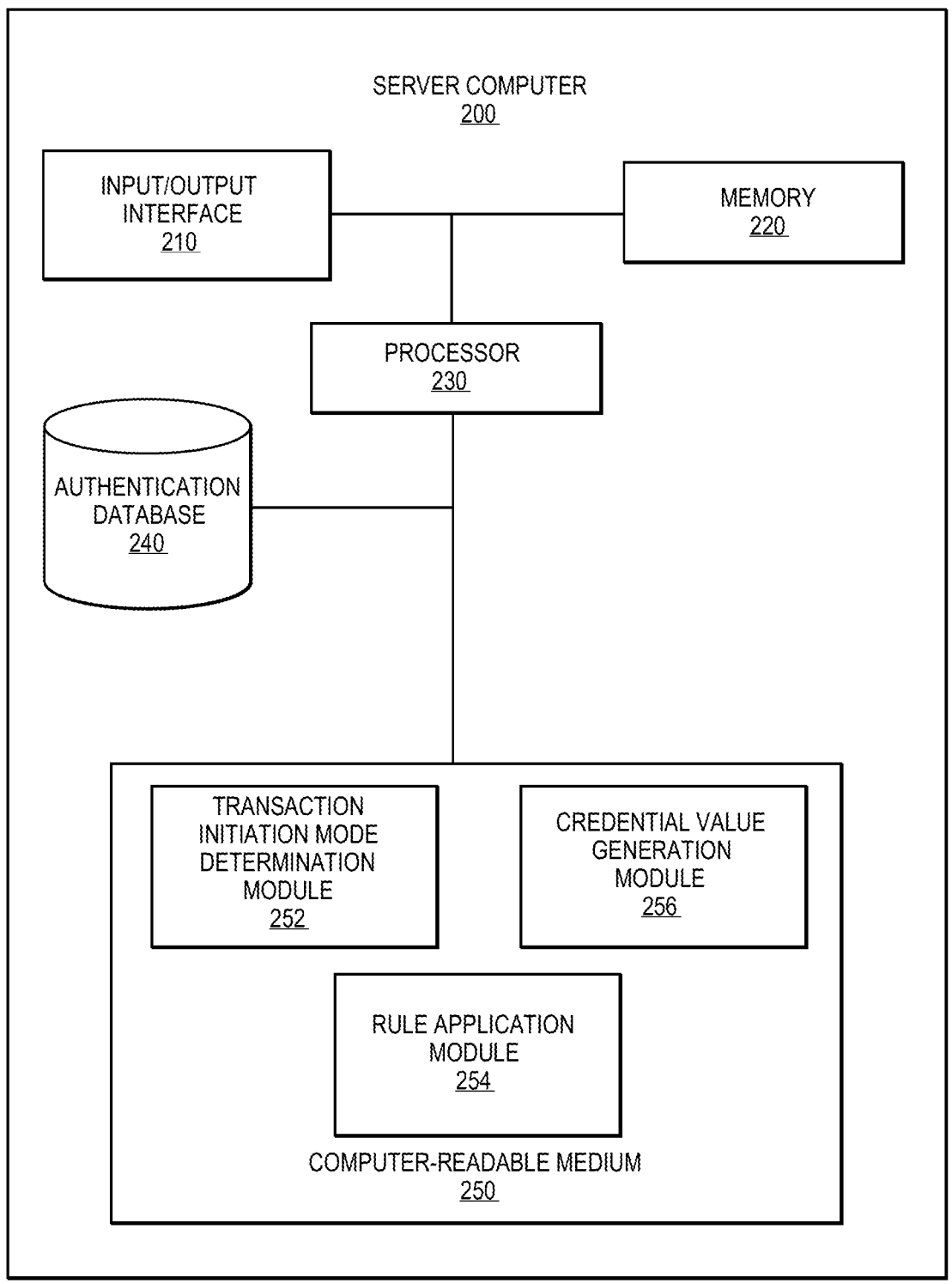
FIG. 2 is a block diagram of a server computer, according to an embodiment of the present invention.

FIG. 2 is a block diagram of a server computer 200, according to an embodiment of the present invention. Server computer 200 includes an input/output interface 210 and a memory 220 in communication with a data processor 230. The processor 230 may also be in communication with an authentication database 240 and a computer-readable medium 250. In some embodiments, the server computer 200 may reside within the interconnected network 160 or within another entity.

The input/output (I/O) interface 210 is configured to receive and transmit data. For example, the I/O interface 210 may receive the transaction data from the communication device 110 (FIG. 1) or access device 120 (FIG. 1). The I/O interface 210 may also transmit and receive data to and from the acquirer 130 (FIG. 1), payment processor network 140 (FIG. 1) and the issuer 150 (FIG. 1). Upon the server computer 200 generating a credential value (described below), the I/O interface 210 may relay the credential value to the access device 120 (FIG. 1) and/or the communication device 110 (FIG. 1). The I/O interface 210 may also be used for direct interaction with the server computer 200. The I/O interface 210 may accept input from an input device such as, but not limited to, a keyboard, keypad, or mouse. Further, the I/O interface may display output on a display device.

Memory 220 may be any magnetic, electronic, or optical memory. It can be appreciated that memory 220 may include any number of memory modules, that may comprise any suitable volatile or non-volatile memory devices. An example of memory 220 may be dynamic random access memory (DRAM).

Processor 230 may be any general-purpose processor operable to carry out instructions on the server computer 200. The processor 230 may be coupled to other units of the server computer 200 including input/output interface 210, memory 220, authentication database 240, and computer-readable medium 250.

Authentication database 240 may store a table of data elements used to compare against a plurality of transaction specific data elements received from communication device 110, access device 120, and/or merchant 125 during a transaction. The table may be used by transaction initiation mode determination module 254 (described below) to determine a transaction initiation mode. The data elements stored in the authentication database 240 may include payment device characteristic information, access device information, and transaction initiation channel information. The payment device characteristic information, access device information, and transaction initiation channel information may be compared to a plurality of fields included in a typical authorization request message, which are stored in the authentication database 240. For example, if the authorization request message includes the following data elements, the transaction initiation mode may be characterized as a secure mobile NFC transaction: cardholder verification method (POS), dynamic card verification value (DCVV) (POS), chip cryptogram, address verification service (AVS), Advanced Authentication (AA) score data, merchant verification value, and a third party agent (TPA) registration ID. In some embodiments, the values within these data elements may be used to determine the transaction initiation mode. For example, the chip cryptogram data element could come in a credentials on a chip or secure element 326 transaction and a secure mobile NFC 324 transaction, and the chip cryptogram may be different for the credentials on a chip or secure element 326 and the secure mobile NFC 324 transaction. Thus, the value of the chip cryptogram may assist in determining the transaction initiation mode.

Computer-readable medium 250 may be any magnetic, electronic, optical, or other computer-readable storage medium. Computer-readable storage medium 250 includes transaction initiation mode determination module 252, rule application module 254, and credential value generation module 256. Computer-readable storage medium 250 may comprise any combination of volatile and/or non-volatile memory such as, for example, buffer memory, RAM, DRAM, ROM, flash, or any other suitable memory device, alone or in combination with other data storage devices.

Transaction initiation mode determination module 252 is configured to evaluate the plurality of data elements received from communication device 110 (FIG. 1) or access device 120 (FIG. 1) with the data elements stored in the authentication database 240. As described above, the payment device characteristic information, access device information, and transaction initiation channel information may be compared to a plurality of fields included in a typical authorization request message, which are stored in the authentication database 240. The transaction initiation mode determination module 252 may determine a payment transaction to be, but is not limited to, one of the following transaction initiation modes: magnetic stripe read (swipe), chip card (dip), secure mobile NFC (wave, remote payment), manual PAN key entry (type, snap), card account on file, certified token, or uncertified token.

Rule application module 254 is configured to determine a specific set of rules applicable to the transaction based on the determined transaction initiation mode. The specific set of rules may include rules defining a merchant's liability for the transaction or rules defining the cost of processing the transaction by the payment processor network 140 (FIG. 1). The specific set of rules may also define the type of authentication processing or payment processing that might be used for a given transaction initiation mode. The server computer 200 may provide the determined set of rules, by rule application module 254, to the payment processor network 140 (FIG. 1).

Credential value generation module 256 is configured to generate a credential value based on the plurality of data elements received by the server computer 200. The evaluation may comprise a yes/no matching verification process, calculation of a validation score, or creation of a hash value that could be passed through existing fields in the authorization message. The resulting value may comprise credential value information. The credential value information can be transmitted to the merchant 125 (FIG. 1) or to the account holder. Further descriptions as to the use and generation of the credential values are provided below.

As noted above, the server computer 200 may reside within the payment processor network 140 (FIG. 1).

Figure 3:
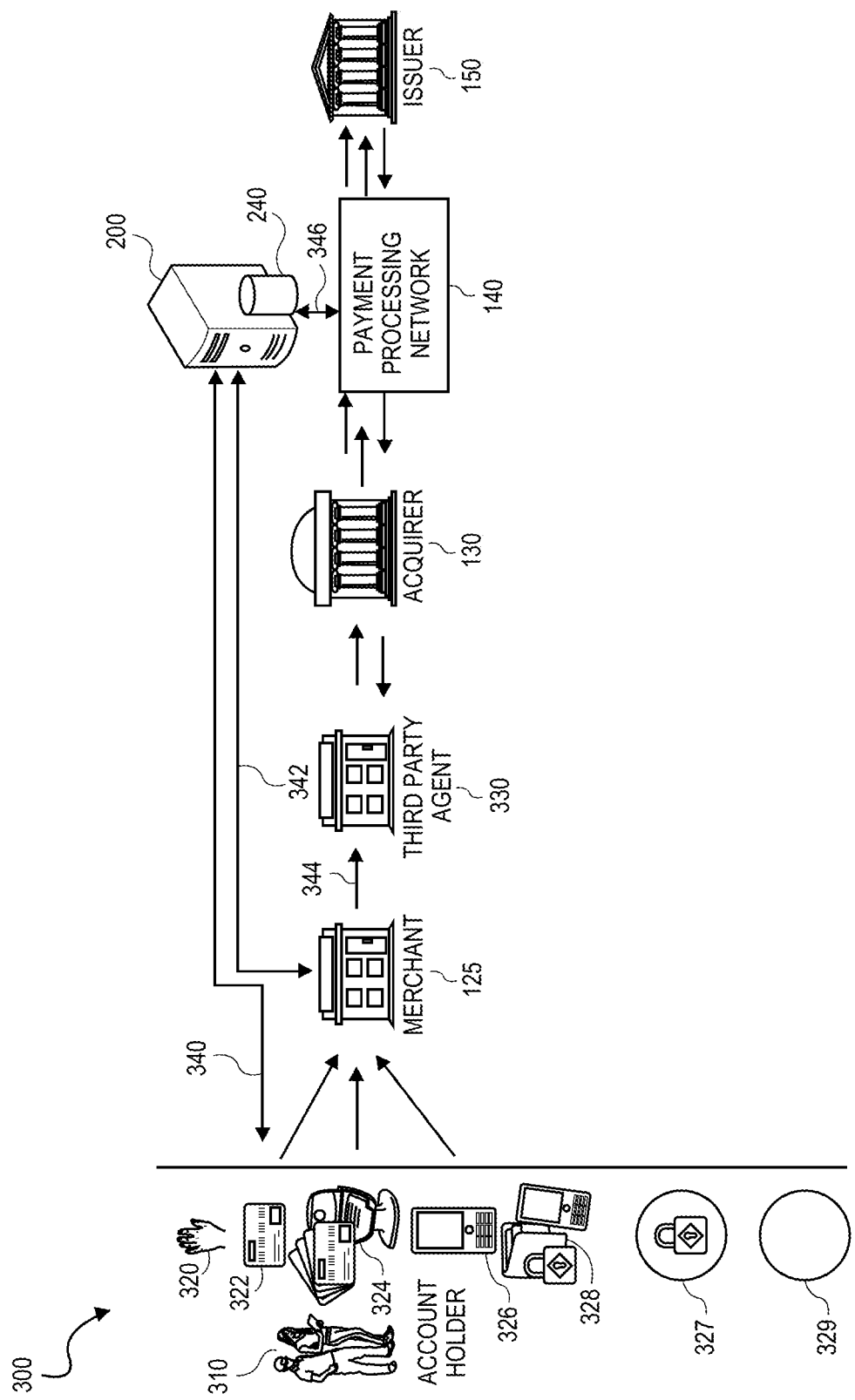
FIG. 3 is a flow diagram illustrating a system that authenticates a user, according to an embodiment of the present invention.

FIG. 3 is a flow diagram illustrating a system 300 that authenticates a user 310, according to an embodiment of the present invention. The system 300 may include many of the elements described in FIG. 1. For example, the system 300 includes a merchant 125, an acquirer 130, a payment processing network 140, and an issuer 150. The system 300 may also include an optional third party agent 330. The third party agent 330 may be a payment service provider (PSP), digital wallet provider (DWP), a payment enabler, etc. In some embodiments, if no third party agent 330 is present, the requests described herein may travel directly from the merchant 125 to the acquirer 130. The system 300 also includes server computer 200, which is communicatively coupled to the payment processing network 140. The server computer 200 may be communicatively coupled to payment processing network 140 via interconnected network 160 (FIG. 1), which is not shown in FIG. 3. Server computer 200 may include an authentication database 240 (FIG. 2). In some embodiments, the server computer 200 may reside within the payment processing network 140.

A user 310 may interact with the system 300 by initiating a payment transaction using a combination of a variety of payment devices and access devices. These may include manual entry 320 of an account number, swiping a payment card at a merchant terminal 322, waving a payment card at a contactless terminal 324, providing a communication device (e.g., mobile phone) that contains payment credentials on a chip (e.g., SIM card) or other secure element 326, or using an account on file 328, a certified token 327, or an uncertified token 329 to conduct a payment transaction. Tokens can be certified by having data embedded indicating certification by a certification entity. An uncertified token 329 is a token that has not been certified by the certification entity. It can be appreciated that the variety of payment devices and access devices listed are merely examples, and many other combinations of payment devices and access devices used to initiate a payment transaction may be used with the system 300. For example, the user 310 may scan a bar code at the merchant terminal using a communication device (e.g., snap transaction).

In another illustration, the user 310 may select goods at a merchant's 125 store and proceed to a check-out area with a terminal. The user 310 can swipe the payment card 322 to pay for the goods. By swiping the payment card 322, the terminal receives the user's primary account number or other relevant information, thereby initiating the payment transaction.

At step 340, credential data may be submitted to the server computer 200 directly or via the merchant 125. The credential data may be submitted in the form of an authorization request message. In some embodiments, this request may be different than the payment authorization request, while in other embodiments the credential data may be submitted with the payment authorization request. The credential data may include data that is typically sent in an authorization transaction message, regardless of the transaction initiation mode. This data could include the transaction amount and date, transaction ID, primary account number, account expiration date, acquirer BIN, merchant category code (MCC), merchant of record (MOR) name and location, card acceptor ID, and terminal ID. The credential data may also include a plurality of data elements that include at least access device information and payment device characteristic information. Some possible data elements include, but are not limited to: data elements for a cardholder verification method (POS), card verification value (CVV), card verification value for integrated circuit cards (iCVV), dynamic card verification value (DCVV) (POS), chip cryptogram, CVV2, cardholder authentication verification value (CAVV), data elements for an address verification service (AVS), data elements for a fraud algorithm such as Advanced Authentication (AA) by Visa®, a merchant verification value, a third party agent (TPA) registration ID, a merchant geo-location (POS), a wallet ID, a registered user status (AII), and level II/III data. In some embodiments, the server computer 200 may request additional data elements, either directly or via the merchant 125, if the received plurality of data elements are not sufficient to determine the transaction initiation mode (described below). For example, additional data elements may be required for an account on file 328, a certified token 327, or an uncertified token 329 transaction initiation mode since the plurality of data elements 450 initially received by the server computer 200 are the same for each of those transaction initiation modes.

It can be appreciated that in addition to the plurality of data elements 450 received by the server computer 200, the server computer 200 may also receive other data elements that are standard and may be necessary for every transaction initiation mode. For example, these other data elements may include a transaction amount/date, a transaction ID, a PAN, an account expiration date, an acquirer BIN, a merchant category code (MCC), a merchant of record (MOR) name and location, a card acceptor ID, and a terminal ID.

In some embodiments, the server computer 200 may also receive a transaction initiation mode data element from the merchant 125 or access device. The transaction initiation data element may readily identify which transaction initiation mode was used to initiate the payment transaction. For example, an access device such as a POS terminal may have an application that analyzes data elements relating to a transaction, and the application may assign a transaction initiation data element to the transaction. As an illustration, a mobile phone with secure element may store a PAN, which is transmitted to a POS terminal. Using information from the mobile phone, and activation data from the POS terminal's RFID reader, the POS terminal may determine that the transaction being conducted is between a contactless terminal and a mobile phone with a secure element and an RFID contactless transmitter and receiver. This type of transaction may be assigned a value (e.g., "118") which may serve as the transaction mode initiation data element. This transaction initiation mode data element may be used by the server computer 200 to determine the transaction initiation mode. In some embodiments, the transaction initiation mode data element may include a unique PSP or Digital Wallet Provider (DWP) ID. The server computer 200 may determine that is the transaction was initiated using a digital wallet transaction or a payment service provider transaction based on detecting the PSP or DWP ID in the transaction initiation mode data element. In some embodiments, the transaction initiation mode data element may be received as part of the authorization request message, while in other embodiments the transaction imitation mode data element may be received separately from the authorization request message.

In other embodiments, the server computer 200 may determine the transaction initiation mode based on the received plurality of data elements. In yet other embodiments, the server computer 200 may receive both a transaction mode initiation data element and additional data elements from an access device and/or a communication device. The additional data elements may be received by the server computer 200 in band (i.e., through the conventional electronics payments messaging path that includes an acquirer, payment processing network, and issuer), or out of band (e.g., by direct communication between the payment processing network and the user's communication device).

At step 342, the server computer 200 may determine the transaction initiation mode initiated by the user 310 by evaluating the received credential data, which may include the plurality of data elements. The transaction initiation mode determination module 252 (FIG. 2) may compare the received plurality of data elements against the table of data elements stored in the authentication database 240 (FIG. 2). As described above, the authentication database 240 (FIG. 2) may include a table of data elements that define which data elements are related to a particular transaction initiation mode. For example, if the authorization request message includes the following data elements, the transaction initiation mode may be characterized as a secure mobile NFC transaction: cardholder verification method (POS), dynamic card verification value (DCVV) (POS), chip cryptogram, address verification service (AVS), Advanced Authentication (AA) score data, merchant verification value, and a third party agent (TPA) registration ID. In this sense, the authentication database 240 (FIG. 2) serves as a rule engine for determining the transaction initiation mode.

The server computer 200 may additionally, via credential value generation module 256, generate a credential value and transmit the generated credential value to the merchant. The credential value may be generated based on an evaluation of the received plurality of data elements and may comprise a yes/no matching verification process, calculation of a validation score, or creation of a hash value that could be passed through existing fields in the authorization message and could be validated by the payment processor network or issuer. The resulting value may comprise credential value information. The credential value information can be transmitted to the merchant 125 or the user 310. It is understood that the credential value may vary depending on the determination of the transaction initiation mode by the transaction initiation mode determination module 252 (FIG. 2). For example, a generated credential value for a card swipe transaction 322 may be different than a generated credential value for a wave transaction 324. The generated credential value may be indicative of the transaction initiation mode. The merchant 125 may then include the credential value in an authorization request message destined for the payment processing network 140.

In some embodiments, at step 344, the merchant 125 can provide the authentication information, including the credential value information, with an authorization request to a third party agent 330 (e.g., payment service provider (PSP), wallet provider, payment enabler), and then to an acquirer 130. When no third party agent 330 is involved, the credential value information and the authorization request may be transmitted directly from the merchant 125 to the acquirer 130. It can be appreciated that the credential value information may be a hash value that includes many unique values. The acquirer 130 can transmit the information to the payment processing network 140, and then to the issuer 150.

The payment processor network 140 may process the credential value information. As described above, the credential value information may indicate what type of transaction was initiated by the user 310. At step 346, the server computer 200 may, via rule application module 254, determine a specific set of rules applicable to the transaction based on the determined transaction initiation mode. In some embodiments, step 346 may occur simultaneous to step 342. The specific set of rules may include rules defining the merchant's 342 liability for the transaction, rules defining the cost of processing the transaction by the payment processor network 140 (FIG. 1), or specific data exchange rules between the various parties involved in the transaction. For example, a perceived risk level may be assessed based on the determined transaction initiation mode. Some transaction initiation modes may be riskier than others. Based on the determined transaction initiation mode, the liability may shift between the merchant 125, acquirer 130, issuer 150, or the payment processor network 140. Similarly, the specific set of rules may define the appropriation of transaction fees between the acquirer 130, payment processing network 140, and issuer 150 based on the determined transaction initiation mode.

The authorization process may be initiated after the credential validation information is processed, as described with respect to step 344. When the authentication information in the authorization request message reaches the payment processing network 140, via the acquirer 130 and merchant 125, the payment processing network 140 may apply the specific set of rules to the transaction prior to forwarding the authentication information to the issuer 150. In an embodiment, the price/value can be affected by the credential data submitted or the credential validation information produced. For example, if the authorization request message includes credential validation information, the payment processing network can use a combination of credential data elements to determine the overall value provided. That is, the cost of processing the transaction or the liability of the transaction can vary based on the specific credential data received and/or the credential validation information received. As an illustration, additional fraud prevention measures may be reduced if transactions are more secure. Three transaction initiation modes may be defined including (i) a first conventional magnetic stripe transaction conducted with a magnetic stripe reader, (ii) a second transaction conducted using a smart card with a chip (and a PAN stored in the chip) and a contactless terminal, and (iii) a third contactless phone transaction conducted with a contactless terminal, where the contactless phone stores a token of a real PAN in a secure element in the phone. As described above, each transaction initiation mode may have a different perceived level of risk. After the server computer 200 identifies the type of transaction, fraud prevention measures may be applied depending upon the level of security associated with the identified transaction initiation mode. Additionally, appropriate processing fees may be applied based on the determined transaction initiation mode. In some embodiments, the fee may be based on the relationship with the merchant 125 and an amount of data exchange provided by the merchant.

After the payment processing network 140 receives the authorization request from the acquirer 130, via the transmission chain of step 344, the payment processing network 140 can apply the specific set of rules to the transaction prior to forwarding the transaction information to the issuer 150 for authorization. The issuer 150 may approve or deny the transaction based on the credential value information included in the authorization request message. For example, if the perceived risk of the determined transaction initiation mode is high, the issuer 150 may deny the transaction or initiate additional fraud prevention measures (e.g., by calling the user 310). Further, based on the determined transaction initiation mode the issuer 150 or the payment processing network 140 may assess varying fees to the transaction and/or liability for the transaction to the merchant 125. Conversely, if the credential value information indicates a low risk transaction initiation mode, the issuer 150 may approve the transaction or not initiate additional fraud prevention measures.

Figure 4A:
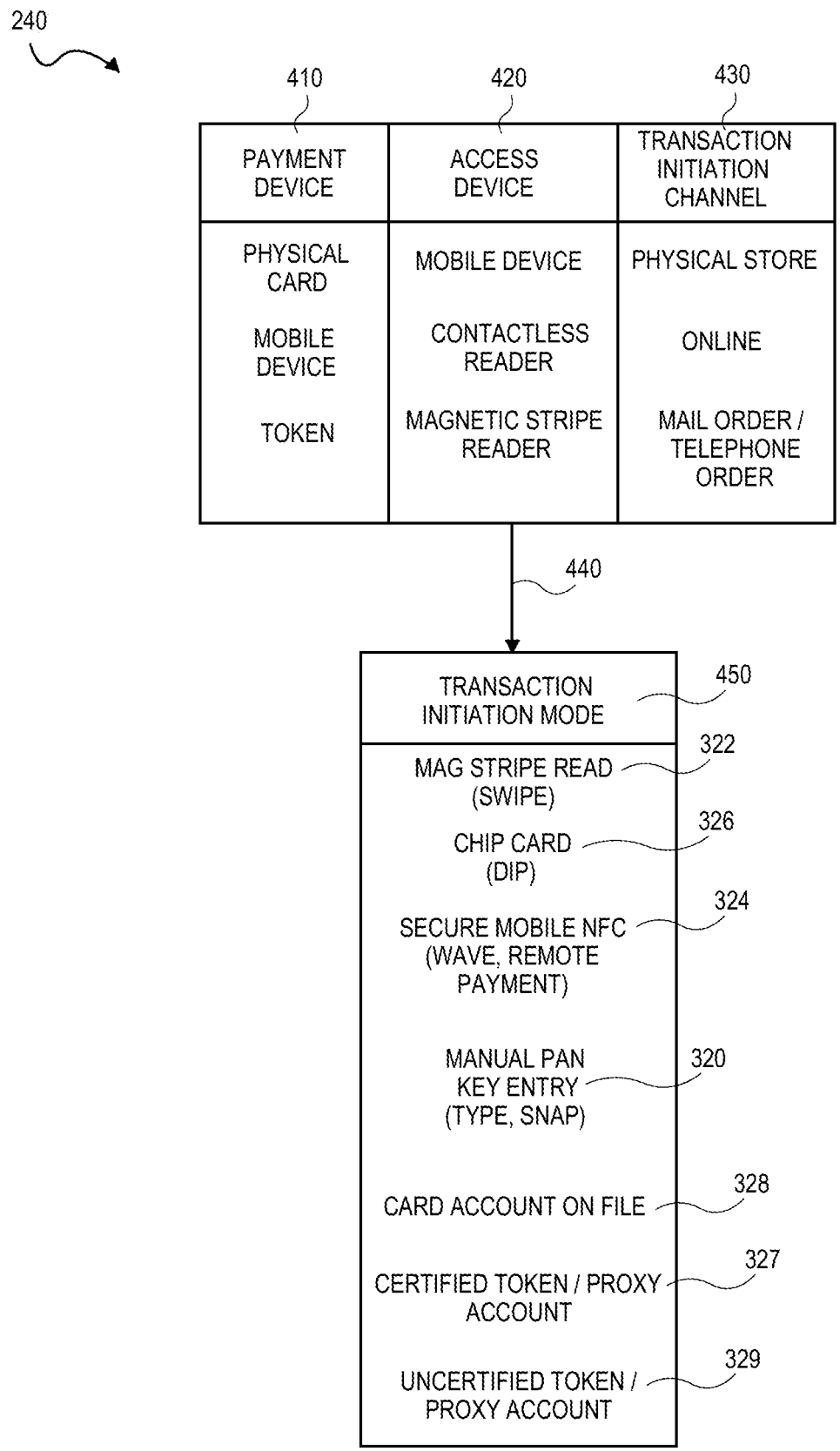
FIG. 4A shows contents of an authentication database, according to an embodiment of the present invention.

FIG. 4A shows contents of an authentication database 240, according to an embodiment of the present invention. The authentication database 240 may include payment device characteristic information 410, access device information 420, and transaction initial channel information 430. The authentication database 240 may also include information about a plurality of transaction initiation modes 450.

The payment device information 410 may include information about which type of payment device what used to initiate a payment transaction. For example, the payment device information 410 could include, but is not limited to, a physical card, a mobile device associated with a payment account, or a secure token. Determining the particular payment device may be accomplished by the transaction initiation mode determination module 252 (FIG. 2) based on the plurality of data elements received by the server computer 200 (FIG. 3), as described further with respect to FIG. 4B.

The access device information 420 may include information about which type of access device was used to initiate the payment transaction. In some embodiments, the payment device may interface with the access device to initiate the transaction. In other embodiments, the payment device and the access device may be the same device. For example, the access device information 420 could include, but is not limited to, a mobile device, a contactless reader, or a magnetic stripe reader. An example of a payment device interfacing with an access device could be a physical card interfacing with a contactless reader at a POS check-out terminal. Determining the particular access device may be accomplished by the transaction initiation mode determination module 252 (FIG. 2) based on the plurality of data elements received by the server computer 200 (FIG. 3), as described further with respect to FIG. 4B.

It is also noted that access devices (e.g., POS terminals) may have multiple modes of operation. For example, a POS terminal may have a contactless reader as well as a magnetic stripe reader. In such cases, the POS terminal may provide additional data which indicates how payment data was read from a payment card. Such additional data may be in the form of a data flag (e.g., "0" for a magnetic strip read and "1" for a contactless read), or such additional data may relate to the formatting of authorization request message by the POS terminal or the data included in the authorization request message. For instance, a contactless card with a chip can have the capability of generating a DCVV (dynamic verification value) while a magnetic stripe can cannot. The presence of the DCVV value in a DCVV field in the authorization request may indicate that the transaction was initiated by the POS terminal's contactless reader, and not the POS terminal's magnetic stripe reader.

The transaction initiation channel information 430 may include information about which type of channel was used to initiate the payment transaction. For example, the transaction initiation channel information 430 could include, but is not limited to, a physical store, online, mail order, or telephone order. Determining the particular transaction initiation channel may be accomplished by the transaction initiation mode determination module 252 (FIG. 2) based on the plurality of data elements received by the server computer 200 (FIG. 3), as described further with respect to FIG. 4B.

The information about the plurality of transaction initiation modes 450 indicates the potential transaction initiation mode categorizations that could be determined by the transaction initiation mode determination module 252 (FIG. 2). For example, at step 440, the transaction initiation mode determination module 252 (FIG. 2) may determine a transaction initiation mode based on the payment device information 410, access device information 420, and the transaction initiation channel information 430. In this way, the payment device information 410, access device information 420, and the transaction initiation channel information 430, is stored as a grid in the authentication database 240. Depending on which payment device, which access device, and which transaction initiation channel is determined, the transaction initiation mode determination module 252 (FIG. 2) may determine (at step 440) the transaction initiation mode 450.

FIG. 4B shows a table 460 illustrating a plurality of data elements 470 that correspond to particular transaction initiation modes, according to an embodiment of the present invention. The plurality of data elements 470 may be sent along with an authorization request message, as described above. The plurality of data elements 470 may represent any of the payment device information 410 (FIG. 4A), access device information 420 (FIG. 4A), and/or the transaction initiation channel information 430 (FIG. 4A), as well as other types of information. The plurality of data elements 470 may include, but is not limited to: data relating to a cardholder verification method (CVM) (POS), card verification value (CVV), card verification value for integrated circuit cards (iCVV), dynamic card verification value (DCVV) (POS), Chip cryptogram, CVV2, cardholder authentication verification value (CAVV), address verification service (AVS), Advanced Authentication (AA) score data, merchant verification value, a third party agent (TPA) registration ID, a merchant geo-location (POS), a registered user status (AII), and level II/III data (which includes stock keeping unit or SKU data). It can be appreciated that the plurality of data elements 470 are merely examples, and any industry standard or non-standard data elements may be present in the authorization request message. For example, another type of data element might be a biometric indicator to indicate that a user's biometric sample (e.g., a fingerprint) was captured by either the access device or the user's communication device.

A transaction initiation mode may be determined based on the received plurality of data elements 470, as described with respect to step 440 of FIG. 4A. The transaction initiation modes 450 may include manual entry 320 of an account number, swiping a payment card at a merchant terminal 322, waving a payment card at a contactless terminal 324, providing a communication device (e.g., mobile phone) that contains payment credentials on a chip (e.g., SIM card) or other secure element 326, an account on file 328, a certified token 327, or an uncertified token 329. A subset of the plurality of data elements 470 may be relevant to specific transaction initiation modes 450. For example, for a swiping a payment card at a merchant terminal 322 transaction initiation mode, the CVM (POS), CVV (POS), AVS, AA Score Data, Merchant Verification Value, TPA Registration ID, and Merchant Geo-location (POS) data elements may be relevant. Upon receiving these data elements, the transaction initiation mode determination module 252 (FIG. 2) may determine the transaction initiation mode to be a merchant terminal 322 transaction, as described with respect to step 440 of FIG. 4A.

In another non-limiting example, for a manual entry 320 of an account number transaction initiation mode, the CVM (POS), CVV2, CAVV, AVS, AA Score Data, Merchant Verification Value, TPA Registration ID, Merchant Geo-location, Level I/III data, and Registered User Status data elements may be relevant. Upon receiving these data elements, the transaction initiation mode determination module 252 (FIG. 2) may determine the transaction initiation mode to be a manual entry 320 of an account number transaction, as described with respect to step 440 of FIG. 4A.

In another non-limiting example, for a communication device containing payment credentials on a chip or other secure element 326 transaction initiation mode, the CVM (POS), iCVV, Chip Cryptogram, AVS, AA Score Data, Merchant Verification Value, TPA Registration ID, and Merchant Geo-location data elements may be relevant. Upon receiving these data elements, the transaction initiation mode determination module 252 (FIG. 2) may determine the transaction initiation mode to be initiated by a communication device containing payment credentials on a chip or other secure element 326, as described with respect to step 440 of FIG. 4A.

In another non-limiting example, for a card account on file 328 transaction initiation mode, the CVV2, CAVV, AVS, AA Score Data, Merchant Verification Value, and TPA Registration ID data elements may be relevant. Upon receiving these data elements, the transaction initiation mode determination module 252 (FIG. 2) may determine the transaction initiation mode to be a manual entry 320 of an account number transaction, as described with respect to step 440 of FIG. 4A.

In another non-limiting example, for a secure mobile NFC 324 transaction initiation mode, the CVM, DCVV, Chip Cryptogram, AVS, AA Score Data, Merchant Verification Value, and TPA Registration ID data elements may be relevant. Upon receiving these data elements, the transaction initiation mode determination module 252 (FIG. 2) may determine the transaction initiation mode to be a secure mobile NFC 324 transaction, as described with respect to step 440 of FIG. 4A.

In another non-limiting example, for a certified token 327 transaction initiation mode, the CVV2, CAVV, AVS, AA Score Data, Merchant Verification Value, TPA Registration ID, Merchant Geo-location, Level II/III data, and Registered User Status data elements may be relevant. Upon receiving these data elements, the transaction initiation mode determination module 252 (FIG. 2) may determine the transaction initiation mode to be a certified token 327 transaction, as described with respect to step 440 of FIG. 4A.

In another non-limiting example, for an uncertified token 329 transaction initiation mode, the CVV2, CAVV, AVS, AA Score Data, Merchant Verification Value, TPA Registration ID, Merchant Geo-location, Level II/III data, and Registered User Status data elements may be relevant. Upon receiving these data elements, the transaction initiation mode determination module 252 (FIG. 2) may determine the transaction initiation mode to be a uncertified token 329 transaction, as described with respect to step 440 of FIG. 4A.

It can be appreciated that the plurality of data elements 450 listed in FIG. 4B may be expanded to reflect new transaction initiation modes. That is, the authentication database 240 (FIG. 2) may be updated with new transaction initiation mode entries and corresponding related data elements when new transaction initiation modes are developed in the future.

Figure 5:
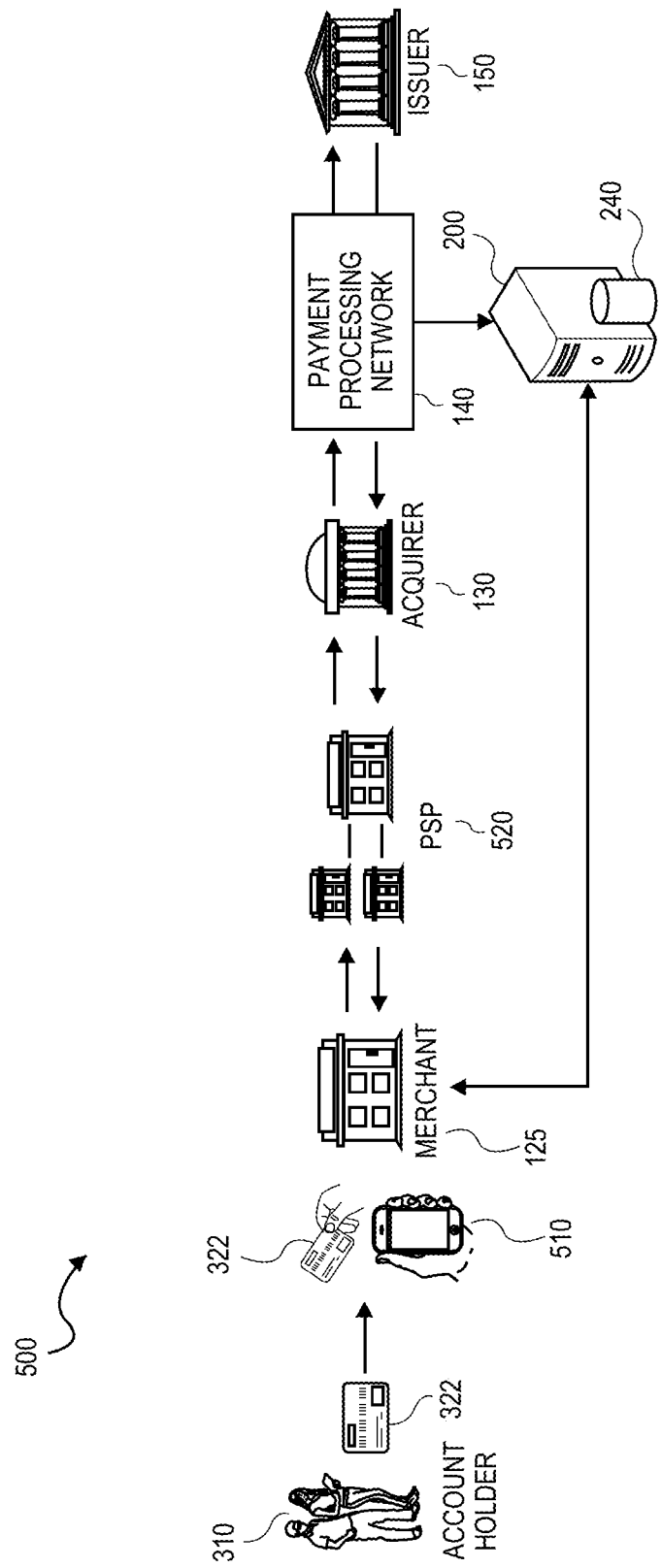
FIG. 5 is a flow diagram illustrating a system that authenticates a user and incorporates a payment service provider, according to an embodiment of the invention.

FIG. 5 is a flow diagram illustrating a system 500 that authenticates a user and incorporates a payment service provider 520, according to an embodiment of the invention. The system 500 in FIG. 5 differs from the system 300 in FIG. 3, as the one in FIG. 5 has a payment service provider 520 where the system in FIG. 3 does not. The payment service provider 520 may offer the merchant 125 services for accepting payments by a variety of payment methods. In some embodiments, the PSP may fully manage the technical connections, relationships, and accounts for the merchant 125.

The transaction flow for determining the transaction initiation mode depicted in FIG. 5 is similar to the transaction flow depicted in FIG. 3. The user (account holder) 310 may initiate a payment transaction by, for example, swiping a payment card 322. The payment card may be swiped a merchant 125 POS terminal or may also be swiped using a communication device 510.

The merchant 125 may then send the authentication information to the server computer 200. As described above with respect to FIG. 3, the server computer 200 may determine, via transaction determination module 252 (FIG. 2), the transaction initiation mode (e.g., swiping a payment card 322) based on a plurality of data elements within the authentication information. The server computer 200 may then transmit a credential value back to the merchant 125. The credential value may be based at least in part on the plurality of data elements and the determined transaction initiation mode.

The merchant 125 may then send an authorization request message, including the credential value, to the payment service provider 520. In some embodiments, the credential value information may be transmitted in a cardholder authentication verification value (CAVV) field within the authorization request message. In some embodiments, the CAVV is generated by the issuer 150 when the cardholder is authenticated. The CAVV may then be sent from the issuer 150 to the PSP 520. The payment service provider 520 may then forward the authorization request message to an acquirer 130 having a relationship with the PSP 520.

Upon receiving the authorization request message, the acquirer 130 may determine whether to accept or deny the transaction based at least in part on the credential value, and then forward the authorization request message to the payment processing network 140 for further processing. The payment processing network 140 may validate the authorization request message and authentication data may be validated prior to the payment processing 140 network interfacing with the issuer 150 to settle the transaction.

Table 1 illustrates some bold and italicized data elements that may be may be desirable for this process flow. In the table below, the "minimum" data elements are those elements that are included for this type of transaction. The data elements that are "supplemental for risk" are data elements that can be additionally used in risk analyses, and the "supplemental for value added services" data elements are those that can be used to provide value added services.

TABLE 1

| | Minimum | Supplemental for Risk | Supplemental for Value Added Services |
|---|---|---|---|
| Account | Primary account number<br>Expiration date | CVV/CVV2/iCVV/DCVV<br>Chip cryptogram<br>CAVV<br>Additional data for score | |
| Account Holder | | Signature/Online PIN<br>AVS<br>User name/password<br>Challenge/response<br>Account holder Device ID and info (IMEI, operating system, language, browser version, etc.) | Account holder location/zip<br>Browsing history<br>Social graph/score |
| Acquirer | Acquirer BIN MCC | | |
| Third Party Agent | MOR name and location | Third Party Agent Registration identifier | |
| Merchant | MOR name and location<br>Sub-merchant name/location<br>Card Acceptor ID<br>Terminal ID | Merchant verification value<br>Merchant Device ID mobile point of sale (UID) | Registered user status/age<br>Merchant location |
| Transaction | Transaction amount/date | | Level 3 data/SKU<br>Electronic receipt |

In some embodiments, the transaction initiation mode may be determined to be a PSP transaction based on a PSP identification data element in the authorization request message. For example, a PSP may register with the payment processor network 140 and provide details about their location, identification, etc. The payment processing network 140 may provide the PSP with a unique PSP ID to use in all authorization request messages. The system 200 may determine that the transaction initiation mode is a PSP transaction by detecting the unique PSP ID in the authorization request message.

Figure 6:
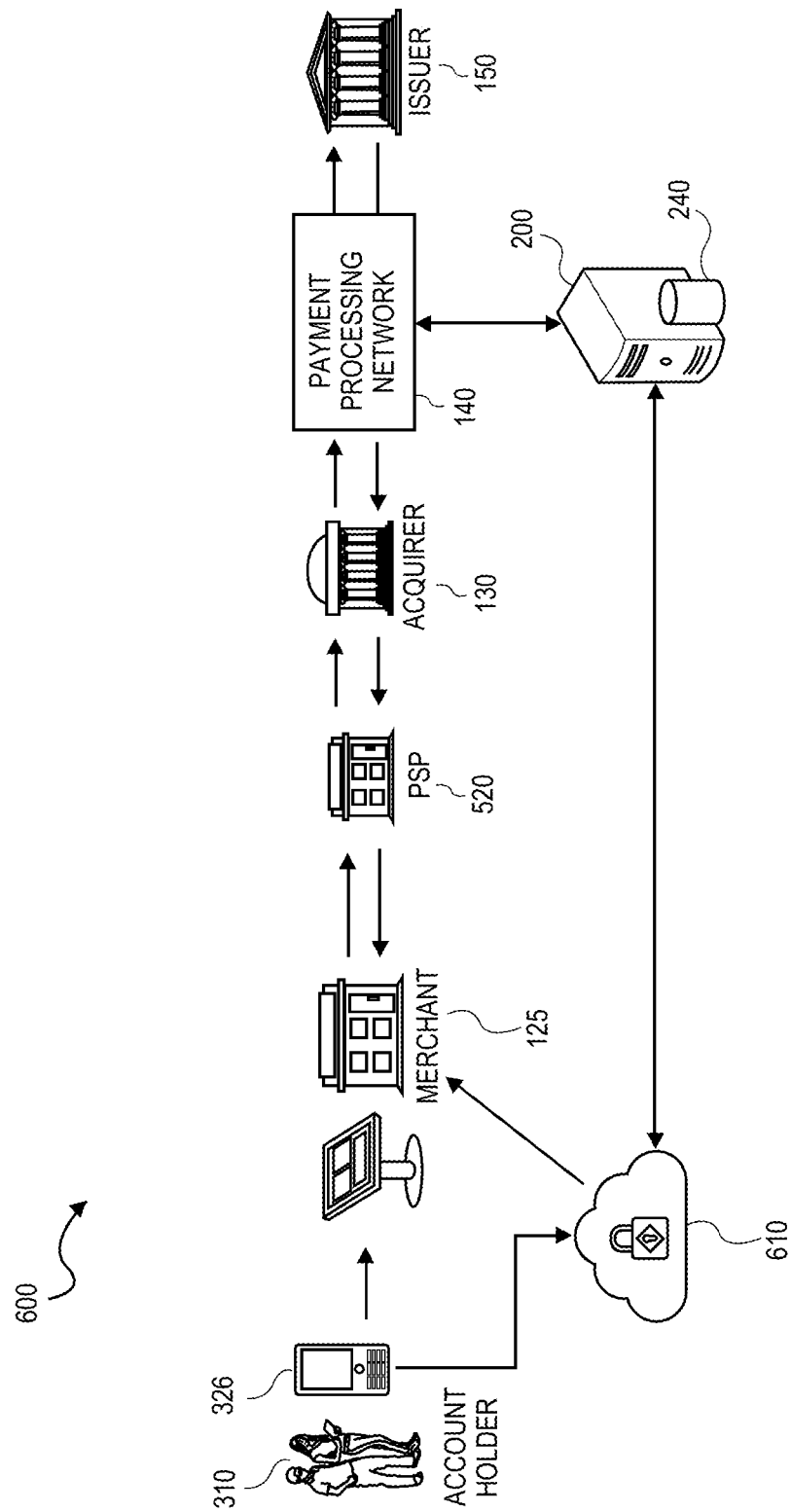
FIG. 6 is a flow diagram illustrating a system that authenticates a user incorporating a communication that contains payment credentials on a chip or other secure element, according to an embodiment of the invention.

FIG. 6 is a flow diagram illustrating a system 600 that authenticates a user 310 incorporating a communication device 326 that contains payment credentials 610 on a chip or other secure element transaction initiation mode, according to an embodiment of the invention. In some embodiments, the communication device 326 may be a mobile device such as a smartphone. In some embodiments, the payment credentials on a chip may be payment credentials on a SIM card.

The transaction flow for determining the transaction initiation mode depicted in FIG. 6 is similar to the transaction flow depicted in FIG. 3. The user (account holder) 310 may initiate a payment transaction by, for example, using a communication device that contains payment credentials 610 on a chip or other secure element. The communication device may interface with a merchant 125 POS terminal. In some embodiments, the user 310 may start an application on the communication device to enable the secure element for use with the merchant 125 POS terminal and to initiate the payment transaction.

In some embodiments, the payment credentials 610 on a chip may be sent to the server computer 200 (out of band or in band), along with authentication information for the payment transaction. As described above with respect to FIG. 3, the server computer 200 may determine, via transaction determination module 252 (FIG. 2), the transaction initiation mode (e.g., swiping a payment card 322) based on a plurality of data elements within the authentication information and also the payment credentials 610. The server computer 200 may then transmit a credential value back to the merchant 125. The credential value may be based at least in part on the plurality of data elements, the payment credentials 610 on a chip, and the determined transaction initiation mode.

The merchant 125 may then send an authorization request message, including the credential value, to the payment service provider 520. In some embodiments, the credential value information may be transmitted in a cardholder authentication verification value (CAVV) field within the authorization request message. The payment service provider 520 may then forward the authorization request message to an acquirer 130 having a relationship with the PSP 520. In some embodiments, where a PSP 520 does not exist, the merchant 125 may send the authorization request message directly to the acquirer 130. In some embodiments, the credential data may also include the underlying payment transaction initiation mode primary account number.

Upon receiving the authorization request message, the acquirer 130 may forward the authorization request message to the payment processing network 140 for further processing. The payment processing network 140 may validate the authorization request message and authentication data may be validated prior to the payment processing 140 network interfacing with the issuer 150 to settle the transaction.

Table 2 illustrates some bold and italicized data elements that may be may be desirable for this process flow:

initiate a payment transaction by, for example, using a card on file 328. The card on file 328 may be stored on the merchant computer 710 or part of a digital wallet. The card on file 328 may be used to interface with a merchant 125 POS terminal. In some embodiments, the user 310 may start an application on a communication device to enable the card on file 328 for use with the merchant 125 POS terminal and to initiate the payment transaction (e.g., when the card on file 328 is stored within a digital wallet application).

In some embodiments, the card on file 328 may be sent to the server computer 200, along with authentication information for the payment transaction. As described above with respect to FIG. 3, the server computer 200 may determine, via transaction determination module 252 (FIG. 2), the transaction initiation mode (e.g., card on file 328) based on a plurality of data elements within the authentication information. The server computer 200 may then transmit a credential value back to the merchant 125. The credential value may be based at least in part on the plurality of data elements and the determined transaction initiation mode.

The merchant 125 may then send an authorization request message, including the credential value, to the acquirer 130. In some embodiments, the credential value information may be transmitted in a cardholder authentication verification value (CAVV) field within the authorization request message. In some embodiments, the credential data may also include the underlying payment transaction initiation mode primary account number.

Upon receiving the authorization request message, the acquirer 130 may determine whether to accept or deny the transaction based at least in part on the credential value, and

TABLE 2

|  | Minimum | Supplemental for Risk | Supplemental for Value Added Services |
| --- | --- | --- | --- |
| Account | Primary account number Expiration date | CVV/CVV2/iCVV/DCVV/SCVV Chip cryptogram CAVV Additional data for risk score | |
| Account Holder | | Signature/Online PIN AVS User name/password Challenge/response Account holder Device ID and info (IMEI, operating system, language, browser version, etc.) | Account holder location/zip Browsing history Social graph/score |
| Acquirer | Acquirer BIN MCC | | |
| Third Party Agent | Merchant name and location | Third Party Agent Registration identifier | |
| Merchant | Merchant name and location PSP identifier and Sub-merchant name/location Card Acceptor ID Terminal ID | Merchant verification value Merchant Device ID mobile point of sale (UID) | Registered user status/ length of time registered Merchant location |
| Transaction | Transaction amount/date | | Level 3 data/SKU Electronic receipt |

Figure 7:
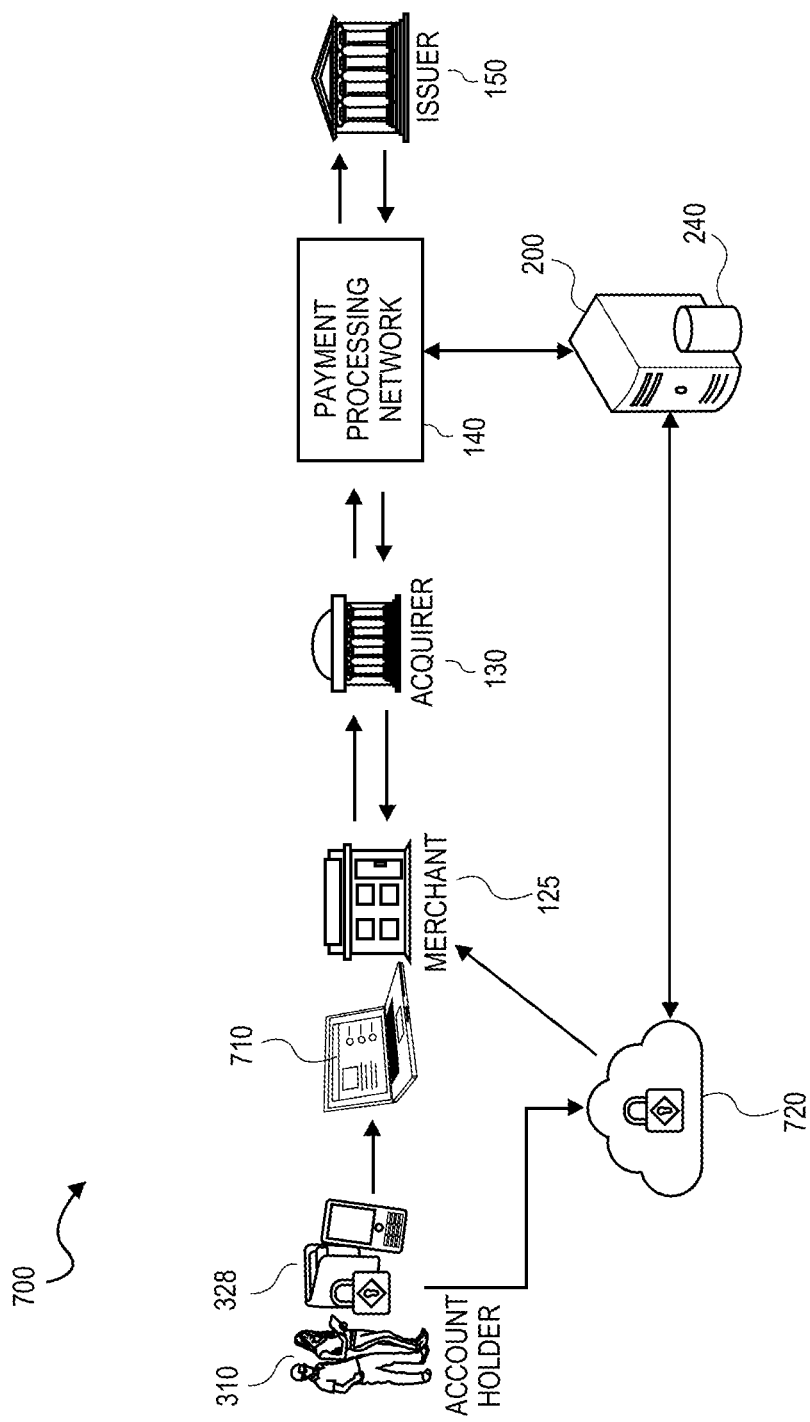
FIG. 7 is a flow diagram illustrating a system 700 that authenticates a user incorporating an account on file, according to an embodiment of the invention

FIG. 7 is a flow diagram illustrating a system 700 that authenticates a user 310 incorporating an account on file 328, according to an embodiment of the invention. In some embodiments, the account on file 328 may be stored in a digital wallet. In other embodiments, the account on file 328 may be stored on a merchant computer 710.

The transaction flow for determining the transaction initiation mode depicted in FIG. 7 is similar to the transaction flow depicted in FIG. 3. The user (account holder) 310 may then forward the authorization request message to the payment processing network 140 for further processing. The payment processing network 140 may validate the authorization request message and authentication data may be validated prior to the payment processing 140 network interfacing with the issuer 150 to settle the transaction.

Table 3 illustrates some bold and italicized data elements that may be may be desirable for this process flow:

TABLE 3

| | Minimum | Supplemental for Risk | Supplemental for Value Added Services |
|---|---|---|---|
| Account | Primary account number<br>Expiration date | CVV/CVV2/iCVV/DCVV<br>Chip cryptogram<br>CAVV<br>Additional data for score | |
| Account Holder | | Signature/Online PIN<br>AVS<br>User name/password<br>Challenge/response<br>Account holder Device ID<br>and info (IMEI, operating<br>system, language, browser<br>version, etc.) | Account holder location/zip<br>Browsing history<br>Social graph/score |
| Acquirer | Acquirer BIN MCC | | |
| Third Party Agent | MOR name and location | Third Party Agent Registration identifier | |
| Merchant | MOR name and location<br>Sub-merchant name/location<br>Card Acceptor ID<br>Terminal ID | Merchant verification value<br>Merchant Device ID mobile<br>point of sale (UID) | Registered user status/age<br>Merchant location |
| Transaction | Transaction amount/date | | Level 3 data/SKU<br>Electronic receipt |

In some embodiments, the transaction initiation mode may be determined to be a digital wallet transaction based on a digital wallet provider identification data element in the authorization request message. For example, a DWP may register with the payment processor network 140 and provide details about their location, identification, etc. The payment processor network 140 may provide the DWP with a unique DWP ID to use in all authorization request messages. The system 200 may determine that the transaction initiation mode is a digital wallet transaction by detecting the unique DWP ID in the authorization request message.

Figure 8:
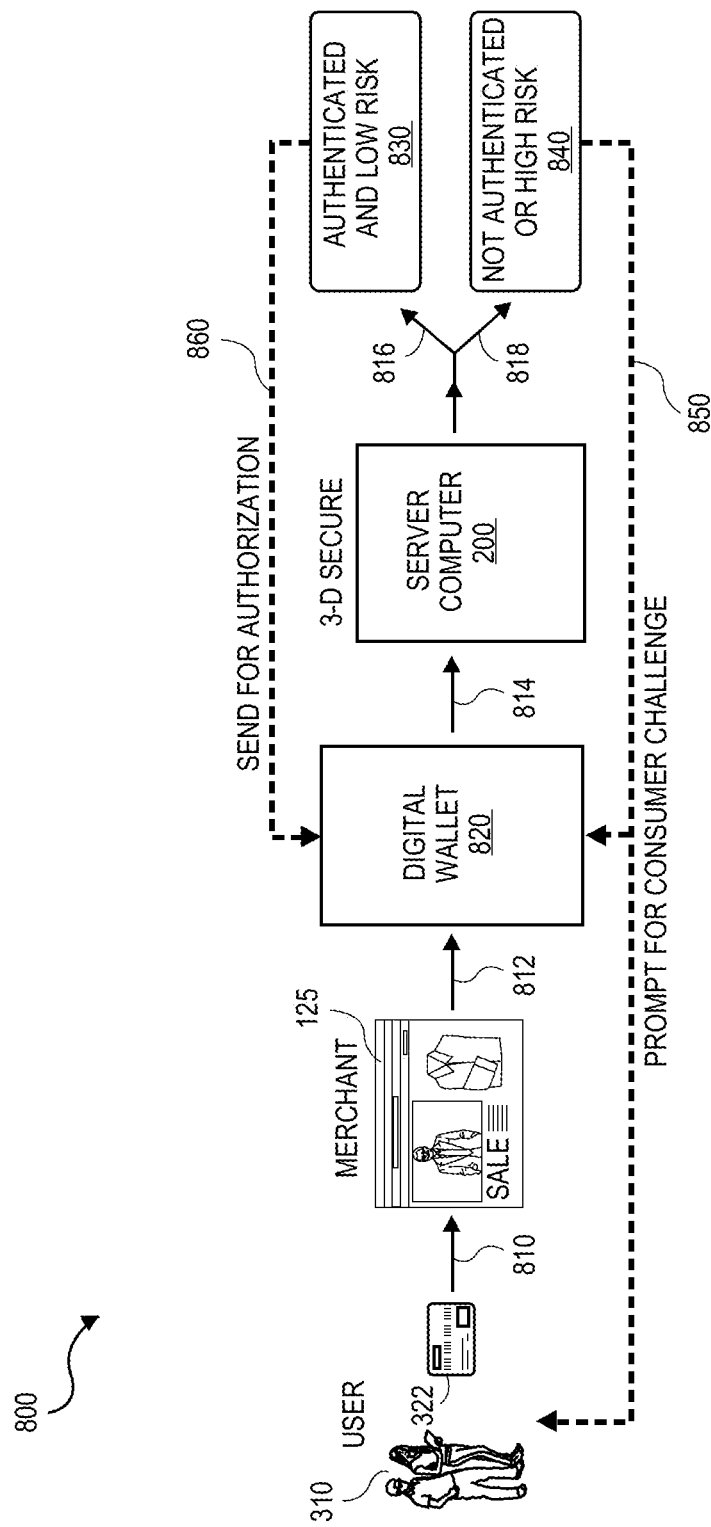
FIG. 8 shows a flow diagram of a system 800 that stores authentication information, according to an embodiment of the invention.

Upon FIG. 8 shows a flow diagram of a system 800 that stores authentication information, according to an embodiment of the invention. At step 810, a user 310 may finalize a purchase at a merchant 125 store and confirm a payment method. In some embodiments, the merchant 125 store may be an online store.

At step 812, in some embodiments, the merchant 125 may provide the user 310 with an option to checkout using a digital wallet 820. At step 814, the digital wallet 820 may send an authorization request to an authentication server computer 200. The authorization request may be sent via a secure protocol. The secure protocol may be a 3-D Secure protocol used in a third party authentication process such as Verified by Visa™.

At step 816 or 818, the authentication service computer may determine if the stored credential in the authorization request (e.g., primary account number, consumer device information, and determined transaction initiation mode by server computer 200) has been previously authenticated. The determination may be in real-time and may comprise a risk assessment for the transaction. The process may then proceed to step 850 or 860. Further details regarding real-time risk analysis that could be incorporated into the above-described system can be found in U.S. Provisional patent application Ser. No. 13/706,226, filed on Dec. 5, 2013, to Faith et al., which is herein incorporated by reference in its entirety for all purposes.

At step 860, the authentication server computer 200 may determine that the transaction is low risk 830 if the data element associated with the user 310 has been previously authenticated and/or if the determined transaction initiation mode is of low risk. In this case, no additional authentication may be required and the transaction may be transmitted to the digital wallet 820 to process the authorization.

At step 850, the authentication service computer may notify the digital wallet 820 if the data element associated with the user 310 has not been previously authenticated or the transaction is high risk 840. For example, the transaction may not be authenticated if the consumer uses a new device or a new primary account number to initiate the transaction. The digital wallet 820 can proceed to authenticate the user 310 via a secure protocol, such as the 3-D secure protocol used by Verified by Visa®. The user 310 may be prompted with a challenge related to the authentication process.

Figure 9:
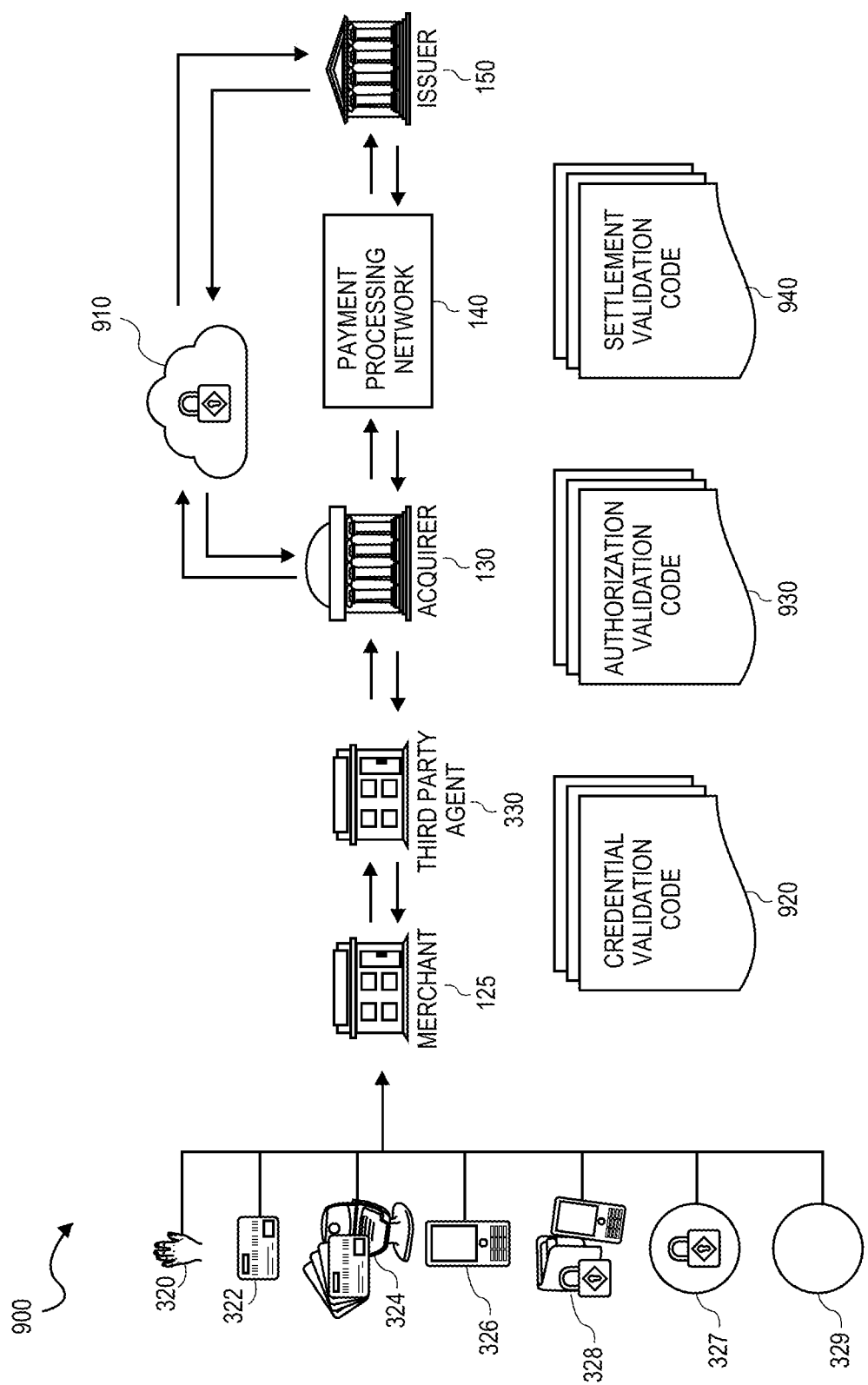
FIG. 9 is a flow diagram illustrating a system that authenticates a user by using credentials, according to an embodiment of the invention.

FIG. 9 is a flow diagram illustrating a system 900 that authenticates a user by using credentials, according to an embodiment of the invention. The credentials may be, but are not limited to, a credential validation code 920, an authorization validation code 930, and a settlement validation code 940.

A user may begin by initiating a payment transaction using one of many transaction initiation modes. The transaction initiation modes include, but are not limited to, manual entry 320 of an account number, swiping a payment card at a merchant terminal 322, waving a payment card at a contactless terminal 324, providing a communication device (e.g., mobile phone) that contains payment credentials on a chip (e.g., SIM card) or other secure element 326, an account on file 328, a certified token 327, or an uncertified token 329.

After the user initiates the payment transaction using one of the transaction initiation modes, a credential validation process may be initiated. The credential validation request may include the credential validation code 920, the authorization validation code 930, and the settlement validation code 940. The credential validation process may be carried out using an authorization request message. The authorization request message may be initiated at the merchant 125 and sent to the acquirer 130. In some embodiments, a third party agent 330 may receive the authorization request message from the merchant 125 and forward it to the acquirer 130. The authorization request message may include a credential validation request. The acquirer 130 may then attempt to validate the credential validation request, via a secure computer 910, between the acquirer 130 and the issuer 150. The server computer 910 may be located out-of-band from the traditional payment transaction process flow described with respect to FIG. 1. That is, the credential validation request may be communicated to the secure computer 910 apart from the payment processing network 140.

In some embodiments, a the secure computer 910 may authenticate the credential validation request based at least in part on a determined transaction initiation mode, as described above with respect to FIG. 3. In some embodiments, the secure computer 910 may be substantially similar to server computer 200 (FIG. 2) and may include a database similar to authentication database 240 (FIG. 2). The secure computer 910 may compare the received credentials in the credential validation request against a plurality of stored credentials within the database. If the received credentials in the credential validation request match the credentials stored within the database, the credentials may be authenticated and the payment transaction may continue via payment processing network 140.

Figure 10:
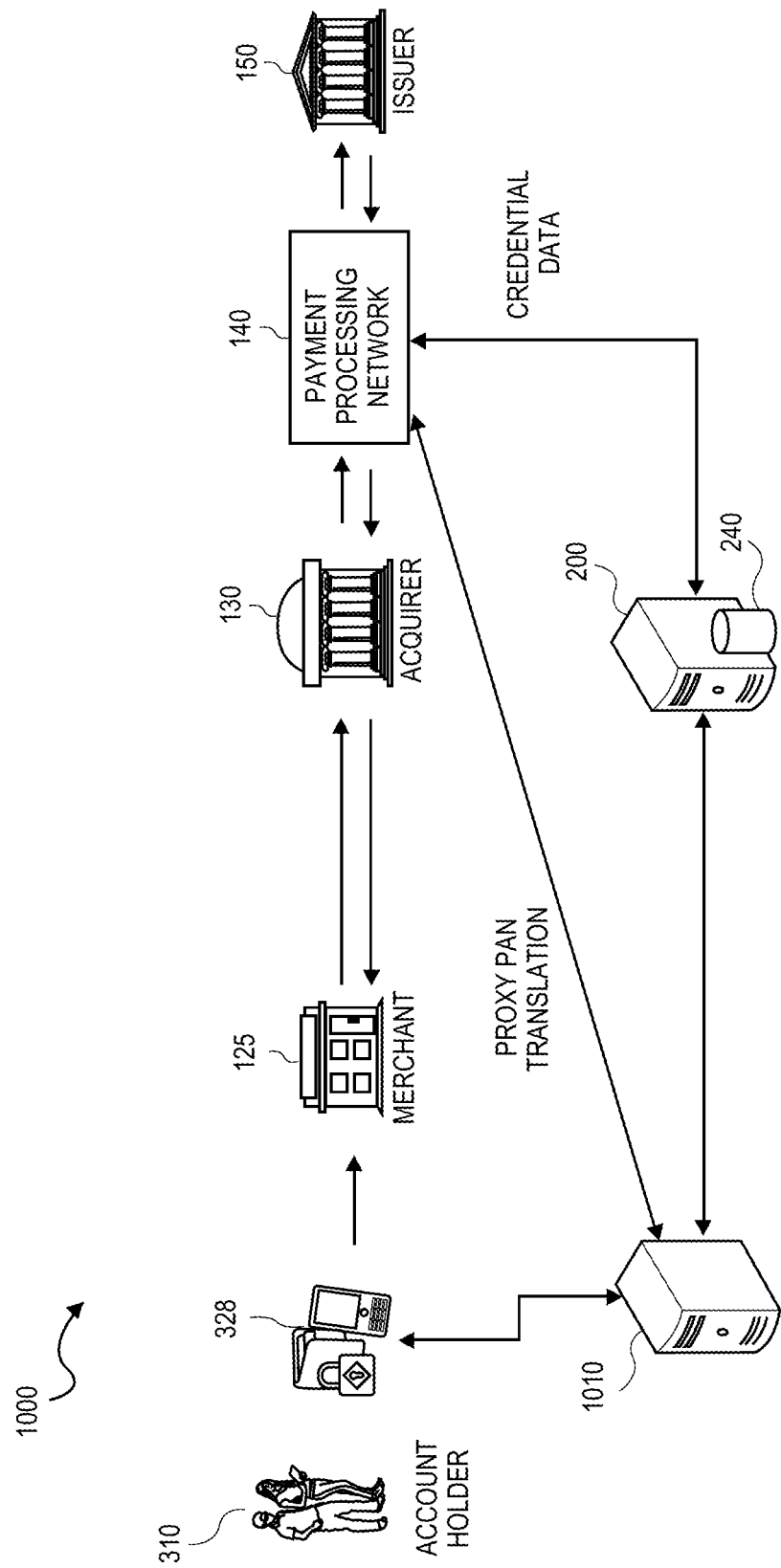
FIG. 10 is a flow diagram illustrating a system that authenticates a user by incorporating an account on file at a point of sale, according to an embodiment of the invention.

FIG. 10 is a flow diagram illustrating a system 1000 that authenticates a user 310 by incorporating an account on file 328 at a point of sale, according to an embodiment of the invention. In some embodiments, the account on file 328 may be a mobile wallet. The system 1000 is similar to the system 700 on FIG. 7, except that a proxy primary account number (token) is used in the transaction. The system 1000 also includes a mobile wallet provider computer 1010 that a mobile wallet software application may connect to. The mobile wallet provider computer 1010 may store credential data and other pertinent data to facilitate a mobile wallet payment transaction.

The user 310 may begin by initiating a mobile wallet software application on a communication device, which in turn initiates a payment transaction. Upon initiation of the payment transaction, credential data and a proxy primary account number may be sent to a mobile wallet provider computer 1010 by the mobile wallet software application running on the communication device. In some embodiments, the credential data may include information about the transaction initiation mode (e.g., an account on file 328 transaction initiation mode). The mobile wallet provider computer 1010 may verify that the received credential data and proxy PAN match data stored within the computer 1010 and associated with the user 310. The mobile wallet provider computer 1010 may then forward the credential data and a translation of the proxy PAN to the payment processor network 140. The translation of the proxy PAN may be a translation from the proxy PAN to an actual PAN associated with the user 310.

In some embodiments, when the credential data does not already include the transaction initiation mode information, the mobile wallet provider computer 1010 may forward the credential data, proxy PAN, and other data elements to the server computer 200. The server computer 200 may determine the transaction initiation mode, as described above, and then forward the credential data with the determined transaction initiation mode, proxy PAN, and other data elements to the payment processing network 140. In some embodiments, the mobile wallet software application may access a wireless signal in order to send and receive data.

In some embodiments, the server computer 200, making use of authentication database 240, may convert the credential data to a stored credential validated value (SCVV) hash value. The hash value may be returned to the mobile wallet software application via the mobile wallet provider computer 1010. The mobile wallet software application may then transmit the transaction data and the stored credential validated value (SCVV) (hash value) in an authorization request message to the acquirer 130, via the merchant 125. The acquirer 130 may forward the transaction data and the authorization request message to the payment processing network 140 to validate the authorization request message and credential data, as done in the typical payment transaction flow of FIG. 1.

II. Exemplary Methods

Figure 11:
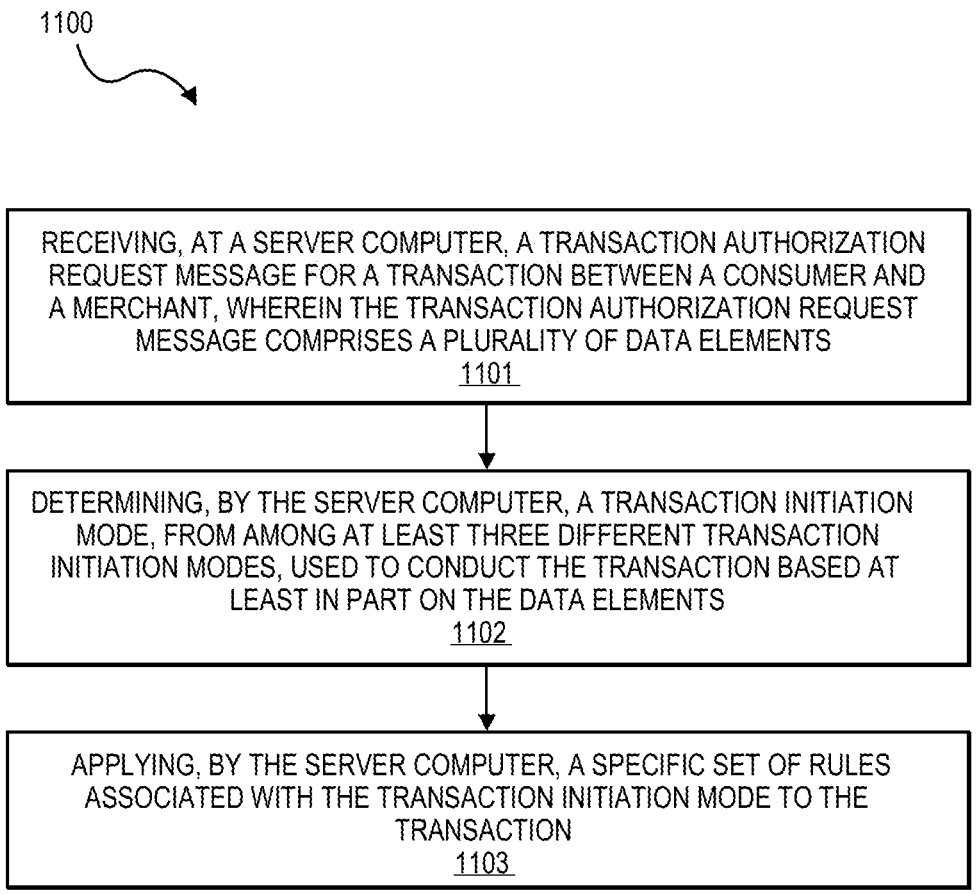
FIG. 11 is a flow diagram illustrating a method for authenticating a user for a transaction at a communication device, according to an embodiment of the invention.

FIG. 11 is a flow diagram illustrating a method 1100 for authenticating a user for a transaction at a communication device, according to an embodiment of the present invention. The method 1100 is performed by processing logic that may comprise hardware (circuitry, dedicated logic, etc.), software (such as is run on a general purpose computing system or a dedicated machine), firmware (embedded software), or any combination thereof. In certain embodiments, the method 1100 is performed by the server computer 200 of FIG. 2.

The method includes receiving, at a server computer, a transaction authorization request message for a transaction between a consumer and a merchant, wherein the transaction authorization request message includes a plurality of data elements (step 1101). For example, in FIG. 3, the server computer may receive an authorization request message between the user and the merchant. The user may initiate a payment transaction using one of a plurality of transaction initiation modes. The authorization request message may include information pertaining to the transaction initiation mode, for example, access device information, payment device characteristic information, transaction initial channel information, etc. In some embodiments, the authorization request message may also include an identifier identifying the transaction initiation mode. In some embodiments, the plurality of data elements may also include information about the merchant or about a third party agent.

After receiving a transaction authorization request between the consumer and the merchant, the method 1100 performed continues by determining, by the server computer, a transaction initiation mode, from among at least three different transaction initiation modes, used to conduct the transaction based at least in part on the data elements (step 1102). For example, in FIG. 3, the server computer may determine the transaction initiation mode used to conduct the payment transaction initiated by the user. The server computer may determine the transaction initiation mode based on the received data elements in step 1101. The received data elements may be compared against the authentication database to determine the transaction initiation mode. In some embodiments, the server computer may send a communication to the merchant or the consumer/user for additional data elements if the received plurality of data elements is insufficient to determine the transaction initiation mode.

As noted above, the server computer may maintain a data table that includes at least three, preferably at least about 5, 10, 20, 50, or even 100 different types of transactions. The data elements that are used to determine which type of transaction is currently being conducted may include data elements relating to an access device (e.g., a type of access device, an access device manufacturer), a payment device (e.g., whether it is a phone, a card, etc.), the type of merchant or the specific merchant, the location of the transaction, characteristics of the user, etc. By providing a more detailed transaction table at the server computer, more detailed and accurate processing of the transaction can occur.

After determining the transaction initiation mode used to conduct the transaction, the method 1100 continues by applying, by the server computer, a specific set of rules associated with the transaction initiation mode to the transaction (step 1103). For example, in FIG. 3, the server computer 200 applies liability and fee appropriation rules to the payment transaction. It can be appreciated that the server computer 200 may apply many other types of rules to the transaction as well.

In some embodiments, the server computer may also generate a credential value based on the received plurality of data elements. The credential value may include risk information about the transaction initiation mode being used to conduct the payment transaction. The credential value may be transmitted from the server computer to the merchant and the merchant may use the credential value in assessing a risk of allowing the transaction. The transaction may be authorized or denied based on the credential value.

In some embodiments, the server computer may generate an electronic receipt that includes the plurality of data elements and transmit the electronic receipt to a communication device operated by the user.

It should be appreciated that the specific steps illustrated in FIG. 11 provide a particular method for authenticating a user for a transaction at a communication device using speaker verification, according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1100.

III. Electronic Receipts Using Transaction Data Elements

Some embodiments of the present invention, relate to systems and methods for incorporating data elements from a transaction message with data elements from an electronic receipt, or incorporating data elements from an electronic receipt data system with a transaction message.

In an illustrative embodiment, a consumer may shop at a first clothing store such as the Gap® and opt to receive an electronic receipt from the first clothing store for the purchase. In a standard transaction, the consumer may receive the electronic receipt from the first clothing store. In an embodiment of the invention, however, a payment processing network may route a transaction message such as an authorization request message for a transaction conducted by a consumer with a payment device from the first clothing store to an issuer. The payment processing network may interact with the first clothing store before the transaction and send an electronic receipt to an electronic device operated by the consumer on behalf of first clothing store. The payment processing network can advantageously transmit standardized receipts from multiple stores.

The electronic receipt may be enhanced with information received in the transaction message by the payment processing network. Further, in an embodiment of the invention, the enhanced receipt can include the location of the consumer (e.g., the geo-location of the consumer at the corner of Main Street and First Street).

In yet another example, the electronic receipt may be enhanced by data appended to the electronic receipt from the payment processing network. For example, the electronic receipt may include data elements required for all transactions, data elements required for risk, or data elements required for value added analysis.

The electronic receipt may include fraud or advertising information. For example, a map of the location of the transaction can be provided on the electronic receipt or the receipt may include offers or advertisements.

The electronic receipt may also include account aging information. For example, the transaction message can include information about how long the consumer used a particular primary account number (PAN) at a particular merchant or information on whether the consumer is a new consumer at a particular store. The system may analyze the frequency with which the consumer may use a payment device (e.g., a consumer shops every Thursday and purchases $300 worth of clothes, consumer has used the PAN three times in three months).

In still another example, the payment processing network can retrieve the payment history for a primary account number (PAN) and incorporate the information in a risk analysis. For example, the payment processing network can build a database and analyze the transaction during real time.

Each of the examples cited above are for illustrative purposes. For example, an entity or system other than a payment processing network may be used to incorporate universal electronic receipts with data elements from a transaction message.

Figure 12:
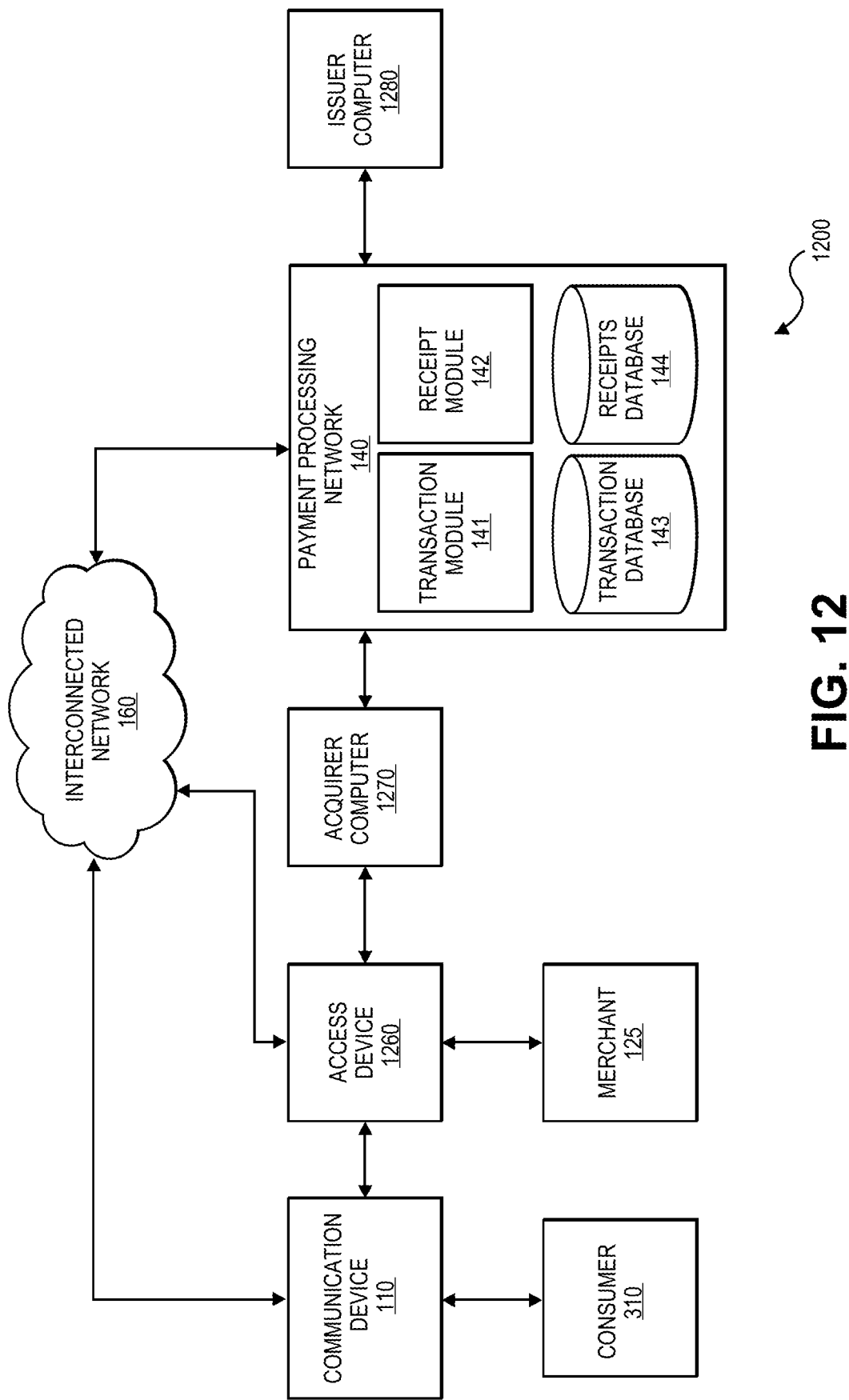
FIG. 12 shows a block diagram of a system that processes electronic receipts and transaction messages, according to an embodiment of the invention.

FIG. 12 shows a block diagram of a system 1200 that processes electronic receipts and transaction messages according to an embodiment of the invention. The embodiments described with reference to FIG. 12 may be combined with any of the embodiments described above, or may be used without the embodiments described above.

The system 1200 may comprise a user 310, a communication device 110 (e.g., a phone that is capable of payments), an interconnected network 160, payment processing network 140, transaction module 141, receipt module 142, transaction database 143, receipt database 144, merchant 125, access device 1260, acquirer computer 1270, and issuer computer 1280. In some embodiments, acquirer computer 1270 may reside within the acquirer 130 (FIG. 1) and issuer computer 1280 may reside within the issuer 150 (FIG. 1). In some embodiments, the communication device 110 may not be capable of making payments, and a payment card (not shown) may be used to interact with the access device 1260.

In an embodiment of the invention, the user 310 may use a communication device 110 to communicate with a payment processing network 140 via an interconnected network 160. The user 310 may register for a universal electronic receipts program with the payment processing network 140. The payment processing network 140 may use a receipt module 142 to process the request. The receipt module 142 may store information about the electronic receipt in the receipt database 144.

The payment processing network 140 may contact a merchant 125 via the interconnected network 160 at a communication device 110. The payment processing network 140 may retrieve information about the particular electronic receipt for the merchant 125. The receipt module 142 may process the information received from the merchant 125, and store any information related to the merchant's electronic receipt in the receipts database 144.

The user 310 may initiate a payment transaction with the communication device 110. The communication device 110 can communicate with the access device 1260 to conduct a transaction. For example, the method of initiating the transaction may be a manual primary account number (PAN) key entry (e.g., typing a PAN, capturing an image of a barcode at the access device and transmitting the image or scraped details), magnetic stripe reader (e.g., swipe), chip card (e.g., dip or wave a consumer device), card account on file (e.g., consumer registers PAN prior to transaction), secure mobile near field communication (NFC) (e.g., wave a consumer device at an access device, remote payment), certified token/proxy account (e.g., consumer registers token or proxy account prior to transaction), or uncertified token/proxy account.

The access device 1260 may transmit the transaction message to an acquirer computer 1270. The transaction message may be an authorization request message and include information about the type of the transaction within the message. The acquirer computer 1270 can transmit the transaction message to the payment processing network 140, which can transmit the transaction message to an issuer computer 1280. The issuer computer 1280 can approve or deny the transaction, and transmit the transaction message back to the payment processing network 140. The transaction message may be an authorization response message. The payment processing network 140 can transmit the transaction message to the acquirer computer 1270, and then to the access device 1260.

In an embodiment, the payment processing network 140 stores information from the transaction messages in the transaction database 143, using the transaction module 141. For example, the transaction module 141 may process the transaction message by extracting information from the message, and storing it in the transaction database.

Prior to or during the transaction initiation, data elements relating to the transaction (e.g., SKU data, access device ID, etc.) may be received at the receipt module from the access device 1260 and/or the consumer device 110 via the interconnected network 160.

The receipt module 142 may process and generate a receipt. For example, the receipt module 142 can query the receipt database 144 with information included in the transaction message, transmit the receipt to the communication device 110 via the interconnected network 160. The receipt may be communicated to the communication device 110 using any suitable messaging protocol including e-mail and SMS messaging protocols.

In some embodiments, the electronic receipt data may be incorporated with transaction messages according to an embodiment of the invention.

In one embodiment of the method, an electronic receipt may be enhanced with transaction data elements. The transaction data elements may include data elements required for all transactions (e.g., primary account number, expiration date of the payment device), data elements required for risk analysis (e.g., address verification system (AVS), geo-location, consumer device identifier, merchant device identifier, or account aging), or data elements required for value added analysis (e.g., stock keeping unit (SKU) data, account aging). Any of these data elements may be incorporated into an electronic receipt. This might be done in order to inform the consumer of someone else of the particular transaction elements associated with a transaction. For example, geo-location information might inform the consumer of where a particular transaction was conducted.

In other embodiments of the invention, information from a receipt may be obtained, and used by a payment processing network. For instance, SKU level data may be obtained from the merchant receipt and used in a fraud analysis or marketing campaign.

Embodiments of processing electronic receipts and transaction messages provide numerous advantages. For example, a positive consumer experience can be provided by aligning a digital wallet transaction with transaction reporting, where possible. A consistent, repeatable approach can be ensured for collecting data requirements or data elements. Implementation options can be facilitated to meet new data requirements or data elements. Further, value exchange can be ensured for merchants who implement universal electronic receipts.

IV. Exemplary Computer Apparatus

The various participants and elements described herein may operate one or more computer apparatuses to facilitate the functions described herein. Any of the elements in the above-described Figures, including any servers or databases, may use any suitable number of subsystems to facilitate the functions described herein.

Figure 13:
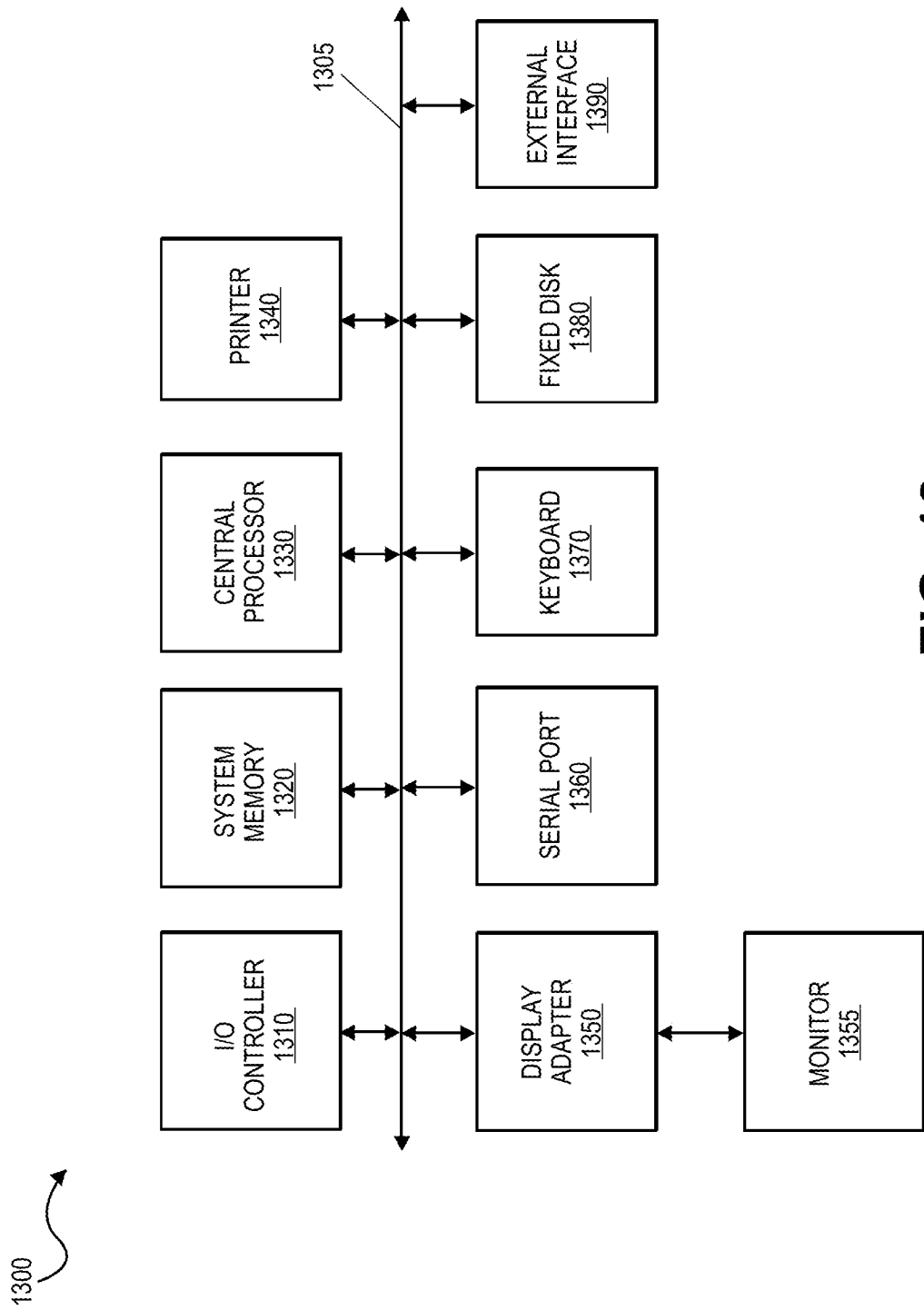
FIG. 13 is a diagram of a computer apparatus, according to an example embodiment.

FIG. 13 is a diagram of a computer apparatus 1300, according to an example embodiment. The various participants and elements in the previously described system diagram (e.g., the communication device, payment processing network, acquiring bank, issuing bank, etc., in FIG. 1 or the server computer in FIG. 2) may use any suitable number of subsystems in the computer apparatus to facilitate the methods and/or functions described herein. Examples of such subsystems or components are shown in FIG. 13. The subsystems shown in FIG. 13 are interconnected via a system bus 1305. Additional subsystems such as a printer 1340, keyboard 1370, fixed disk 1380 (or other memory comprising computer-readable media), monitor 1355, which is coupled to display adapter 1350, and others are shown. Peripherals and input/output (I/O) devices (not shown), which couple to I/O controller 1310, can be connected to the computer system by any number of means known in the art, such as serial port 1360. For example, serial port 1360 or external interface 1390 can be used to connect the computer apparatus to a wide area network such as the Internet, a mouse input device, or a scanner. Alternatively, peripherals can be connected wirelessly (e.g., IR, Bluetooth, etc.). The interconnection via system bus allows the central processor 1330 to communicate with each subsystem and to control the execution of instructions from system memory 1320 or the fixed disk 1380, as well as the exchange of information between subsystems. The system memory 1320 and/or the fixed disk 1380 (e.g., hard disk, solid state drive, etc.) may embody a computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

One or more embodiments of the invention may be combined with one or more other embodiments of the invention without departing from the spirit and scope of the invention.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method, comprising:
   receiving, at a merchant computer, a request to complete a transaction via a transaction initiation mode;
   determining, based on the transaction initiation mode, a plurality of data elements to be included in a transaction request, the plurality of data elements comprising at least payment device information, access device information, and transaction initiation channel information;
   generating a request that includes the plurality of data elements to be routed to a server computer;
   sending the transaction request to the server computer, wherein the plurality of data elements are used by the server computer to determine the transaction initiation mode and to generate a credential value based on the plurality of data elements, wherein the server computer is caused to determine a security level for the determined transaction initiation mode and provide that security level to an authorization computer;
   receiving, from the server computer, the generated credential value,
   generating a transaction request that includes the credential value;
   routing the transaction request to the authorization computer;
   receiving a response from the authorization computer indicating an approval status of the transaction, wherein the approval status of the transaction is determined based on whether a level of risk calculated from information in the transaction request is below the security level; and
   completing the transaction upon determining that the approval status indicates that the transaction is allowed.

2. The method of claim 1, wherein the plurality of data elements comprise at least one of information about the merchant computer or information about the authorization computer.

3. The method of claim 1, further comprising receiving, from the server computer by the merchant computer, a request for additional data elements subsequent to the step of sending the transaction request to the server computer.

4. The method of claim 3, further comprising:
   generating a response to the request for additional data elements to include values for the additional data elements; and
   sending the response to the request for additional data elements to the server computer prior to receiving the generated credential value.

5. The method of claim 1, wherein the security level is determined using a set of rules specific to the transaction initiation mode.

6. The method of claim 5, wherein the set of rules specific to the transaction initiation mode define a cost associated with processing the transaction.

7. The method of claim 1, further comprising causing the server computer to:
   generate an electronic receipt indicating the plurality of data elements; and
   provide the generated electronic receipt to a user associated with the transaction.

8. The method of claim 7, wherein the electronic receipt is provided to a user device belonging to the user associated with the transaction.

9. The method of claim 1, wherein the security level comprises a level of risk which is acceptable for a particular type of transaction initiation mode.

10. The method of claim 1, further comprising causing the server computer to validate the plurality of data elements prior to generating the credential value.

11. A merchant computer, comprising:
    a processor; and
    a non-transitory computer-readable storage medium, comprising instructions that, when executed by the processor, cause the merchant computer to:
    receive a request to complete a transaction via a transaction initiation mode;
    determine, based on the transaction initiation mode, a plurality of data elements to be included in a transaction request, the plurality of data elements comprising at least payment device information, access device information, and transaction initiation channel information;
    generate a request that includes the plurality of data elements to be routed to a server computer;
    send the transaction request to the server computer, wherein the plurality of data elements are used by the server computer to determine the transaction initiation mode and to generate a credential value based on the plurality of data elements, wherein the server computer is caused to determine a security level for the determined transaction initiation mode and provide that security level to an authorization computer;
    receive, from the server computer, the generated credential value,
    generate a transaction request that includes the credential value;
    route the transaction request to the authorization computer;
    receive a response from the authorization computer indicating an approval status of the transaction, wherein the approval status of the transaction is determined based on whether a level of risk calculated from information in the transaction request is below the security level; and complete the transaction upon determining that the approval status indicates that the transaction is allowed.

12. The merchant computer of claim 11, wherein the plurality of data elements comprise at least one of information about the merchant computer or information about the authorization computer.

13. The merchant computer of claim 11, wherein the instructions further cause the merchant computer to receive, from the server computer, a request for additional data elements subsequent to the step of sending the transaction request to the server computer.

14. The merchant computer of claim 13, wherein the instructions further cause the merchant computer to:
generate a response to the request for additional data elements to include values for the additional data elements; and
send the response to the request for additional data elements to the server computer prior to receiving the generated credential value.

15. The merchant computer of claim 11, wherein the security level is determined using a set of rules specific to the transaction initiation mode.

16. The merchant computer of claim 15, wherein the set of rules specific to the transaction initiation mode define a cost associated with processing the transaction.

17. The merchant computer of claim 11, wherein the instructions further cause the merchant computer to cause the server computer to:
generate an electronic receipt indicating the plurality of data elements; and
provide the generated electronic receipt to a user associated with the transaction.

18. The merchant computer of claim 17, wherein the electronic receipt is provided to a user device belonging to the user associated with the transaction.

19. The merchant computer of claim 11, wherein the security level comprises a level of risk which is acceptable for a particular type of transaction initiation mode.

20. The merchant computer of claim 11, wherein the instructions further cause the merchant computer to cause the server computer to validate the plurality of data elements prior to generating the credential value.

* * * * *